(12) United States Patent
Sakaguchi et al.

(10) Patent No.: US 10,059,368 B2
(45) Date of Patent: Aug. 28, 2018

(54) ELECTRIC POWER STEERING APPARATUS

(71) Applicant: NSK LTD., Tokyo (JP)

(72) Inventors: Toru Sakaguchi, Maebashi (JP); Shoya Maruyama, Maebashi (JP)

(73) Assignee: NSK LTD., Shinagawa-ku, Tokyo (JP)

( * ) Notice: Subject to any disclaimer, the term of this patent is extended or adjusted under 35 U.S.C. 154(b) by 0 days.

(21) Appl. No.: 15/512,713

(22) PCT Filed: Dec. 24, 2015

(86) PCT No.: PCT/JP2015/085953
§ 371 (c)(1),
(2) Date: Mar. 20, 2017

(87) PCT Pub. No.: WO2016/104569
PCT Pub. Date: Jun. 30, 2016

(65) Prior Publication Data
US 2017/0297613 A1 Oct. 19, 2017

(30) Foreign Application Priority Data

Dec. 25, 2014 (JP) .................................. 2014-262244
Sep. 16, 2015 (JP) .................................. 2015-183259
(Continued)

(51) Int. Cl.
*B62D 5/04* (2006.01)
*B62D 6/02* (2006.01)
(Continued)

(52) U.S. Cl.
CPC .............. *B62D 5/0463* (2013.01); *B62D 6/02* (2013.01); *B62D 6/08* (2013.01); *G05B 13/041* (2013.01)

(58) Field of Classification Search
CPC .......... B62D 5/0463; B62D 6/02; B62D 6/08; G05B 13/041
See application file for complete search history.

(56) References Cited

U.S. PATENT DOCUMENTS

| 2015/0291210 A1* | 10/2015 | Kageyama | ............ B60T 8/1755 |
| | | | 701/41 |
| 2016/0221601 A1* | 8/2016 | Barthomeuf | ......... B62D 5/0469 |
| 2017/0327144 A1* | 11/2017 | Sakaguchi | ........... B62D 5/0463 |

FOREIGN PATENT DOCUMENTS

| JP | 6-004417 B2 | 1/1994 |
| JP | 2006-213174 A | 8/2006 |

(Continued)

OTHER PUBLICATIONS

International Search Report for PCT/JP2015/085953 dated Mar. 29, 2016 [PCT/ISA/210].

(Continued)

*Primary Examiner* — Thomas Ingram
(74) *Attorney, Agent, or Firm* — Sughrue Mion, PLLC

(57) ABSTRACT

An electric power steering apparatus includes a control section that includes a feed-back control section which sets a viscoelastic model as a reference model within a predetermined angle at front of a rack end. The feed-back control section includes a feed-back element to calculate a target rack displacement based on an input-side rack axial force and a control element to output an output-side rack axial force based on a position deviation between the target rack displacement and a rack displacement.

30 Claims, 42 Drawing Sheets

(30) Foreign Application Priority Data

Sep. 16, 2015 (JP) .................................. 2015-183265
Sep. 16, 2015 (JP) .................................. 2015-183266

(51) Int. Cl.
*B62D 6/08* (2006.01)
*G05B 13/04* (2006.01)

(56) References Cited

FOREIGN PATENT DOCUMENTS

JP          4115156 B2      7/2008
WO     2014/195625 A2     12/2014

OTHER PUBLICATIONS

Written Opinion for PCT/JP2015/085953 dated Mar. 29, 2016 [PCT/ISA/210].

* cited by examiner

PRIOR ART

ELECTRIC POWER STEERING APPARATUS

CROSS REFERENCE TO RELATED APPLICATIONS

This application is a National Stage of International Application No. PCT/JP2015/085953, filed on Dec. 24, 2015, which claims priority from Japanese Patent Application No. 2014-262244, filed on Dec. 25, 2014, and Japanese Patent Application Nos. 2015-183259, 2015-183265, and 2015-183266, filed Sep. 16, 2015, the contents of all of which are incorporated herein by reference in their entirety.

TECHNICAL FIELD

The present invention relates to an electric power steering apparatus that calculates a current command value based on at least a steering torque, drives a motor by using the current command value, and provides a steering system of a vehicle with an assist torque, and in particular to the electric power steering apparatus that sets a viscoelastic model as a reference (normative) model, decreases the assist torque by reducing the current command value near a rack end, decreases a striking energy by attenuating a force at an end hitting time, suppresses a hitting sound (a noisy sound) that a driver feels uncomfortable, and improves a steering feeling.

More particularly, the present invention relates to a high-performance electric power steering apparatus that can appropriately deal with various kinds of road surface conditions by changing model parameters of the reference model and control parameters of a control system (a feedback control section) based on a rack axial force and a rack displacement, or by suppressing the shock by means of an input limitation.

BACKGROUND ART

An electric power steering apparatus (EPS) which provides a steering system of a vehicle with an assist torque by means of a rotational torque of a motor, applies a driving force of the motor as the assist torque to a steering shaft or a rack shaft by means of a transmission mechanism such as gears or a belt through a reduction mechanism. In order to accurately generate the assist torque, such a conventional electric power steering apparatus performs a feed-back control of a motor current. The feed-back control adjusts a voltage supplied to the motor so that a difference between a current command value and a detected motor current value becomes small, and the adjustment of the voltage supplied to the motor is generally performed by an adjustment of duty command values of a pulse width modulation (PWM) control.

A general configuration of the conventional electric power steering apparatus will be described with reference to FIG. 1. As shown in FIG. 1, a column shaft (a steering shaft or a handle shaft) 2 connected to a steering wheel 1 is connected to steered wheels 8L and 8R through reduction gears 3, universal joints 4a and 4b, a rack-and-pinion mechanism 5, and tie rods 6a and 6b, further via hub units 7a and 7b. In addition, the column shaft 2 is provided with a torque sensor 10 for detecting a steering torque Th of the steering wheel 1, and a motor 20 for assisting a steering force of the steering wheel 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command on the basis of a steering torque Th detected by the torque sensor 10 and a vehicle speed Vel detected by a vehicle speed sensor 12, and controls a current supplied to the motor 20 by means of a voltage control value Vref obtained by performing compensation or the like to the calculated current command value.

A controller area network (CAN) 40 to send/receive various information and signals on the vehicle is connected to the control unit 30, and it is also possible to receive the vehicle speed Vel from the CAN. Further, a Non-CAN 41 is also possible to connect to the control unit 30, and the Non-CAN 41 sends and receives a communication, analogue/digital signals, electric wave or the like except for the CAN 40.

In such an electric power steering apparatus, the control unit 30 mainly comprises a CPU (including an MPU and an MCU), and general functions performed by programs within the CPU are, for example, shown in FIG. 2.

Functions and operations of the control unit 30 will be described with reference to FIG. 2. The steering torque Th from the torque sensor 10 and the vehicle speed Vel from the vehicle speed sensor 12 are inputted into a torque control section 31 to calculate a current command value Iref1, and the calculated current command value Iref1 is inputted into a subtracting section 32B, where a detected motor current value Im is subtracted from the current command value Iref1. A deviation I (=Iref1−Im) which is the subtracted result in the subtracting section 32B is controlled in the current control section 35 such as a proportional-integral (PI) control and so on. The voltage control value Vref obtained by the current control is inputted into a PWM-control section 36 which calculates duty command values, and PWM-drives the motor 20 through an inverter circuit 37 by means of a PWM signal. The motor current value Im of the motor 20 is detected by a motor current detector 38, and is inputted and fed back to the subtracting section 32B. Further, a rotational angle sensor 21 such as a resolver is connected to the motor 20 and a steering angle θ is detected and outputted.

In such the electric power steering apparatus, when a large assist torque from the motor is applied to the steering system near the maximum steering angle (the rack end) thereof, a strong impact (a shock) occurs at a time when the steering system reaches at the maximum steering angle, and the driver may feel uncomfortable because of generating the hitting noise (noisy sound) due to the shock.

The electric power steering apparatus that includes a steering angle judging means for judging whether the steering angle of the steering system reaches at a front by a predetermined value from the maximum steering angle and a correcting means for correcting which decreases the assist torque by reducing the power supplied to the motor when the steering angle reaches at a front by a predetermined value from the maximum steering angle, is disclosed in Japanese Examined Patent Application Publication No.H6-4417 B2 (Patent Document 1).

Further, the electric power steering apparatus disclosed in Japanese Patent No.4115156 B2 (Patent Document 2) is that: the electric power steering apparatus that judges whether an adjustment mechanism becomes near an end position or not, controls a driving means so as to decrease a steering assist when the adjustment mechanism reaches at near the end position, and evaluates an adjustment speed determined by a position sensor in order to determine the speed when the adjustment mechanism approaches to the end position.

THE LIST OF PRIOR ART DOCUMENTS

Patent Documents

Patent Document 1: Japanese Examined Patent Application Publication No.H6-4417 B2
Patent Document 2: Japanese Patent No.4115156 B2

SUMMARY OF THE INVENTION

Problems to be Solved by the Invention

However, since the electric power steering apparatus disclosed in Patent Document 1 decreases the power when the steering angle reaches at a front by a predetermined value from the maximum steering angle and the steering velocity or the like is not entirely considered, it is impossible to perform a fine current-decreasing control. Patent Document 1 does not disclose the characteristics to decrease the assist torque of the motor and a concrete configuration is not shown.

Further, although the electric power steering apparatus disclosed in Patent Document 2 decreases an assist amount toward the end position, it adjusts the decreasing speed of the assist amount in response to a velocity approaching to the end position and sufficiently falls down the speed at the end position. However, Patent Document 2 shows only to vary the characteristic changing in response to the speed and is not subjected based on a physical model. Furthermore, since Patent Document 2 does not perform the feed-back control, there is a fear that the characteristic or the result vary depending on a road surface condition (a load state).

The present invention has been developed in view of the above-described circumstances, and it is an object of the present invention is to provide a high-performance electric power steering apparatus that constitutes a control system based on a physical model, constitutes a model-following control that an output (a distance to a rack end) of a controlled object follows-up to an output of a reference model, eliminates or reduces the occurrences of a noisy sound and a shock force at an end hitting without giving any uncomfortable steering feeling to a driver, and eliminates or reduces the shock force by changing model parameters and control parameters for a feed-back (FB) control section or by limiting an input.

Means for Solving the Problems

The present invention relates to an electric power steering apparatus that calculates a current command value based on at least a steering torque and assist-controls a steering system by driving a motor based on said current command value, the above-described object of the present invention is achieved by that comprising: a configuration of a model following control comprising a feed-back control section including a viscoelastic model as a reference model within a predetermined angle $x_0$ at front of a rack end, wherein the feed-back control section comprises a feed-back element to calculate a target rack displacement based on an input-side rack axial force f, and a control element section to output an output-side rack axial force ff based on a positional deviation between the target rack displacement and a rack displacement x; and wherein the electric power steering apparatus further includes a correcting section that changes parameters of at least one-side of the feed-back element and the control element section and sets changed parameters;

or by further comprising: an axial force calculating section to calculate a rack axial force f4 based on the steering torque and the current command value; and a limiter to limit a maximum value of the rack axial force f4 with a limiting value and to output the input-side rack axial force f;

or by further including: a rack axial force calculating section that calculates the input-side rack axial force f from a rack axial force f3 based on the steering torque and the current command value, wherein the rack axial force calculating section comprises an absolute value/sign section to calculate an absolute value and a sign of the rack axial force f3; a judging section to judge whether the absolute value is a threshold or more; a subtracting section to subtract the threshold from the absolute value; a multiplying section to multiply a subtracted result with the sign; and a switching section to output a multiplied result or a fixed value.

Effects of the Invention

Because the electric power steering apparatus according to the present invention constitutes a control system based on the physical model, it is possible to easily see daylight for a constant design. Since the present electric power steering apparatus constitutes the model-following control so that the output (the distance to the rack end) of the controlled object follows-up to output of the reference model, the present invention has an advantage effect that a robust (tough) end-hitting suppressing-control becomes possible against variations of the load state (external disturbance) and the controlled object.

Further, according to the electric power steering apparatus of the present invention, because the model parameters of the reference model and the parameters of the control elements are variably set based on the rack axial force and the rack displacement, the controllability of the apparatus is further improved. Furthermore, since the input of the rack axial force is limited, there are advantage effects that it is possible to eliminate or reduce the shock and to deal with the various road surface conditions.

BRIEF DESCRIPTION OF THE DRAWINGS

In the accompanying drawings.

MODE FOR CARRYING OUT THE INVENTION

Figure 1:
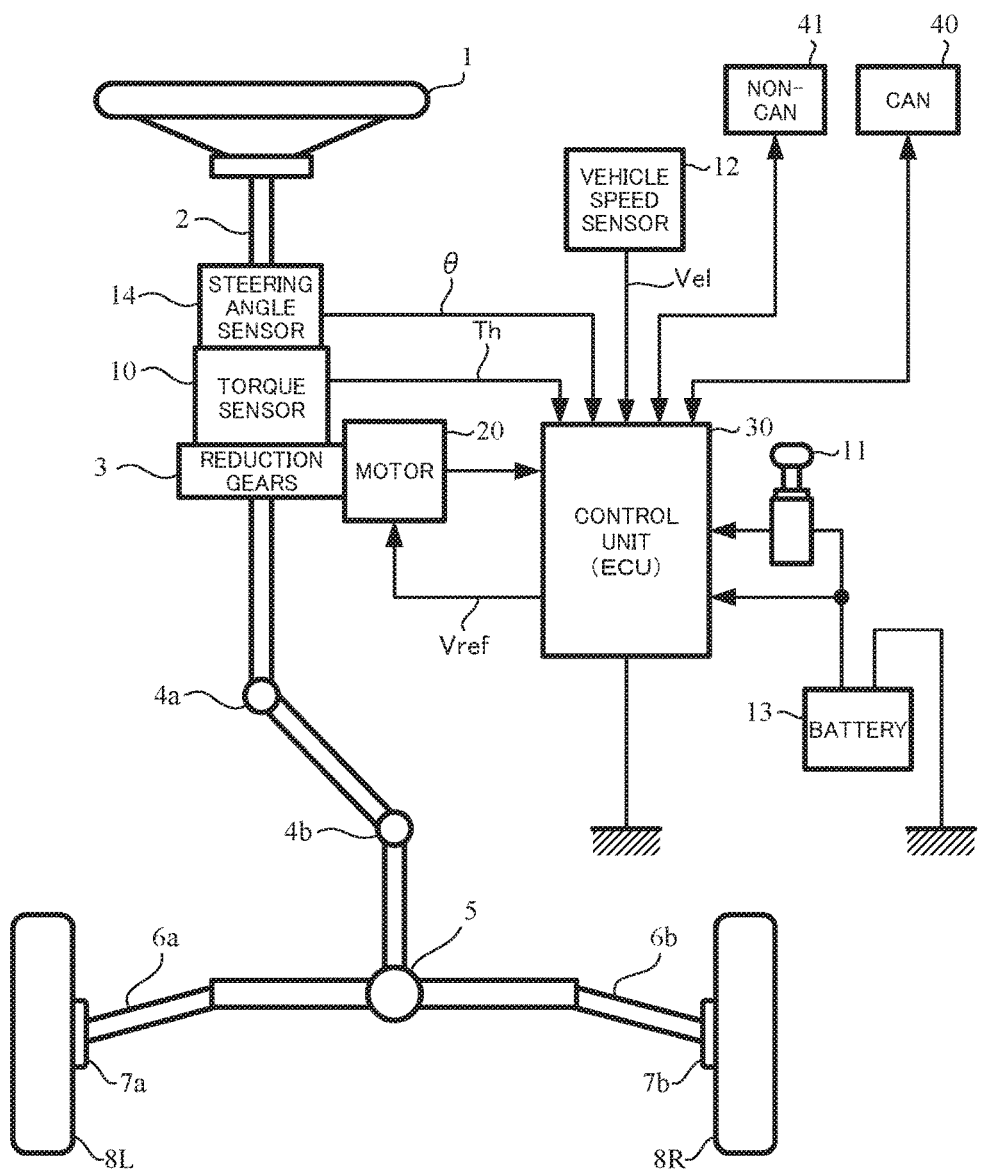
FIG. 1 is a configuration diagram illustrating a general outline of an electric power steering apparatus.

An electric power steering apparatus according to the present invention constitutes a control system based on a physical model near a rack end, sets a viscoelastic model (a spring constant and a viscous friction coefficient) as a reference (normative) model, constitutes a model-following control so that an output (a distance to the rack end) of a controlled object follows-up to output of the reference model, eliminates or reduces an occurrence of a noisy sound at an end hitting time without giving a steering uncomfortable feeling to a driver, and attenuates a shock force.

The model-following control comprises a viscoelastic model following control section. The viscoelastic model following control section comprises a feed-forward control section or a feed-back control section, or a combination thereof. The viscoelastic model following control section performs a normal assist-control out of a predetermined angle at a front of the rack end, and performs the model-following control within the predetermined angle at the front of the rack end so as to attenuate the shock force at a rack end hitting time.

Further, the present invention changes the model parameters of the viscoelastic model of the model-following control and the control parameters (control gains of the feed-back control section) with respect to the control elements within a predetermined angle, and changes the model parameters and the control parameters in response to the rack axial force when the rack position is within the predetermined angle. For example, a spring term of the viscoelastic model and the control gain are set small at a position near a start steering angle, and they are set larger as the rack position approaches at the rack end. When the rack position is within the predetermined angle, the smaller the rack axial force is, the larger the spring term and the control gain are set. Thus, the control variable near the start steering angle can be small and the change amount of the assist amount within and out of the predetermined angle range becomes small. In this way, the driver does not feel uncomfortable for a reaction force due to the change of the assist amount. Since the control gain is set large and the controlled variable is large at a region near the rack end, the shock force can be attenuated when the steering position reaches at the rack end.

Furthermore, the rack axial force within the predetermined angle range is varied depending on the road surface state (asphalt, a wet road surface, an ice surface, a snow surface, or the like). The rack axial force is small in a case (the ice surface or the snow surface) that a friction coefficient of the road surface is small, and it is large since the surface friction coefficient is large on the asphalt road. When the model parameters and the control parameters (the gains) are adequately set for the asphalt road, these parameters may not be appropriate for the ice surface, the snow surface or the like. In a case that the friction coefficient is small, a margin which can generate the large assist force toward the rack end is large, the steering angle greatly leads and a possibility to reach at the rack end progresses. Accordingly, it is desired the following system: the smaller the rack axial force at a time when the steering angle enters within the predetermined angle range is, the larger a spring constant of the viscoelastic model is and the higher the control gain is, and therefore the steering lead-angle is small. Consequently, the electric power steering apparatus according to the present invention comprises a correcting section being capable of enlarging the spring constant and the control gain as the rack axial force is small. In other embodiments, the shock is suppressed by limiting the maximum input of the rack axial force with a limiting value.

Hereinafter, embodiments of the present invention will be described with reference to the accompanying drawings.

Figure 2:
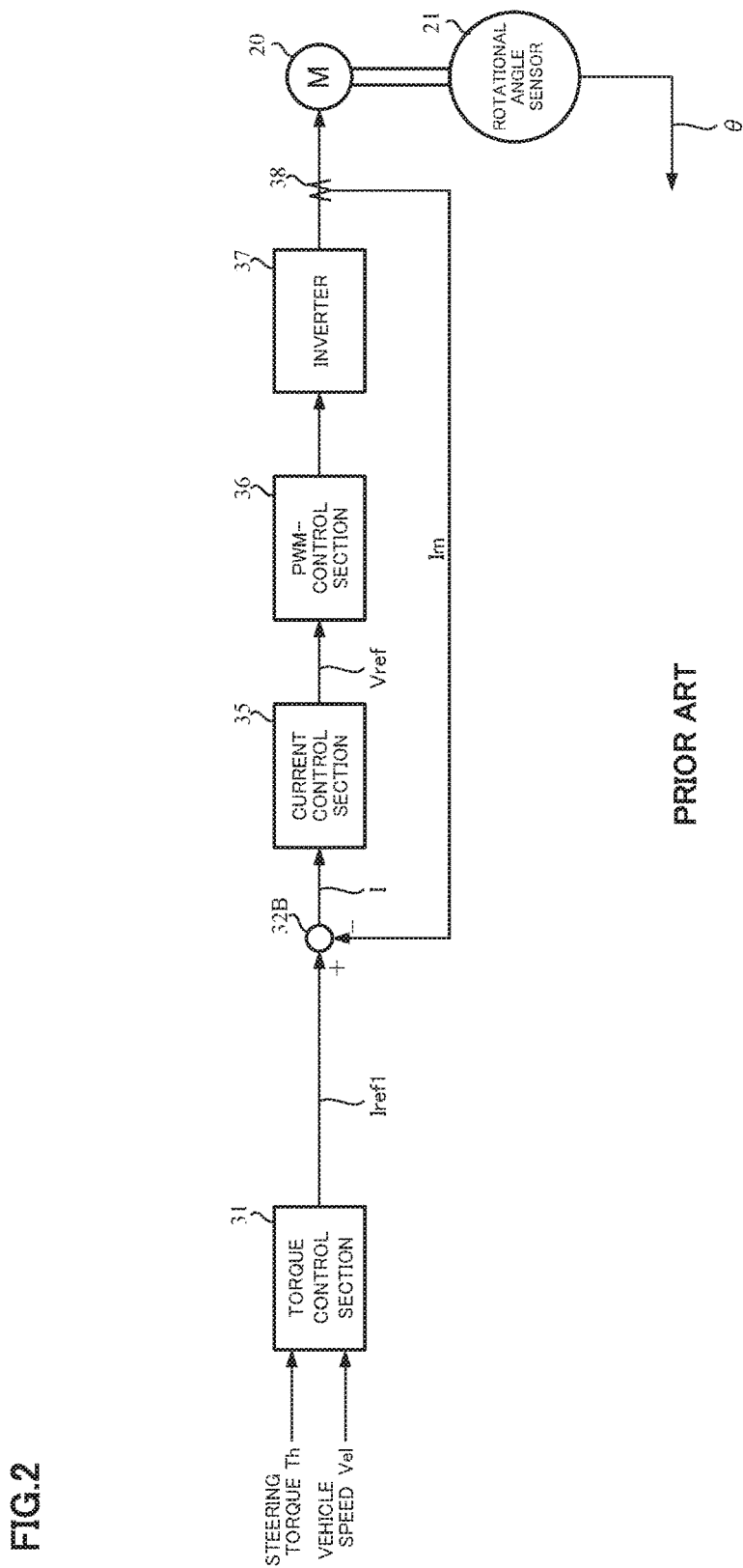
FIG. 2 is a block diagram showing a general configuration example of a control system of the electric power steering apparatus.

First, the model-following control which is essential of the present invention is described with reference to FIG. 3 corresponding to FIG. 2.

Figure 3:
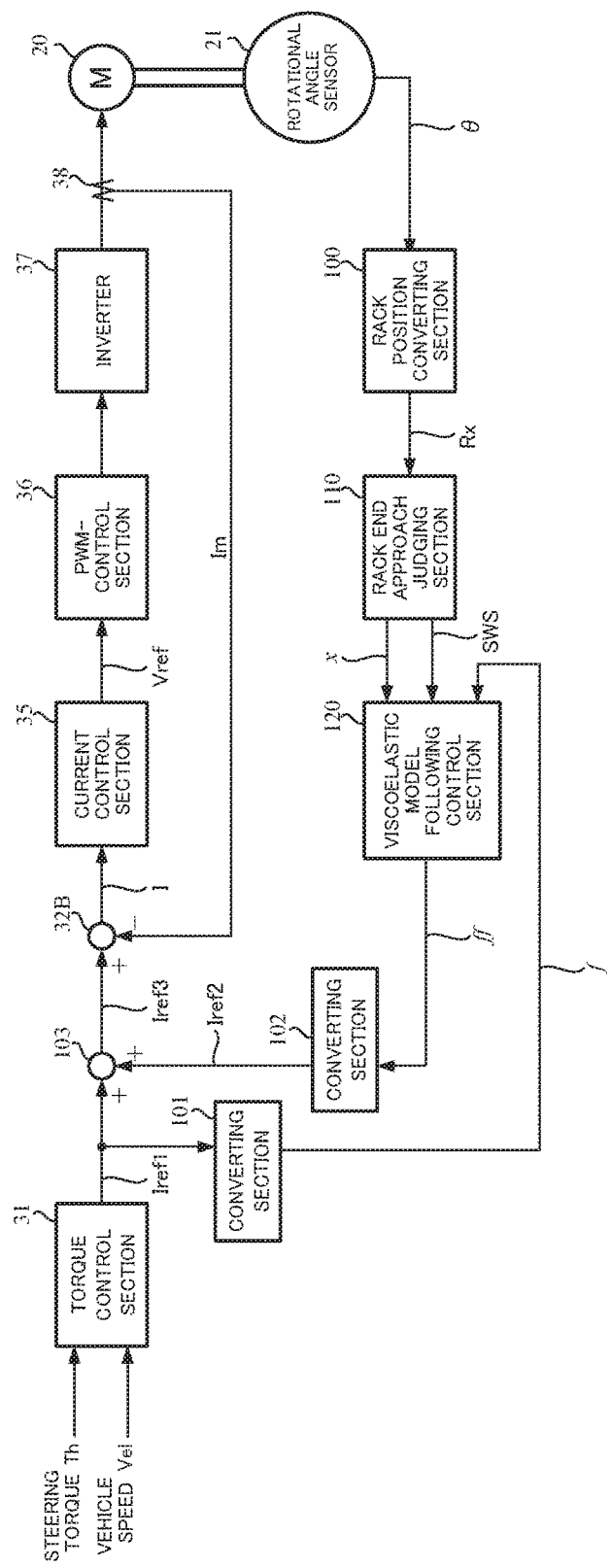
FIG. 3 is a block diagram showing a configuration example of the present invention.

In the model-following control shown in FIG. 3, a current command value Iref1 is converted to the rack axial force f in the converting section 101, and the rack axial force f is inputted into a viscoelastic model following control section 120. Although the rack axial force f is equivalent to a column shaft torque, the column shaft torque is conveniently considered as the rack axial force in the following description.

A conversion from the current command value Iref1 to the rack axial force f is performed based on the below Equation 1.

$$f = G1 \times Iref1 \quad \text{[Equation 1]}$$

where, Kt is a torque constant [Nm/A], Gr is a reduction ratio, Cf is a stroke ratio [m/rev.], and G1=Kt×Gr×(2π/Cf).

Figure 4:
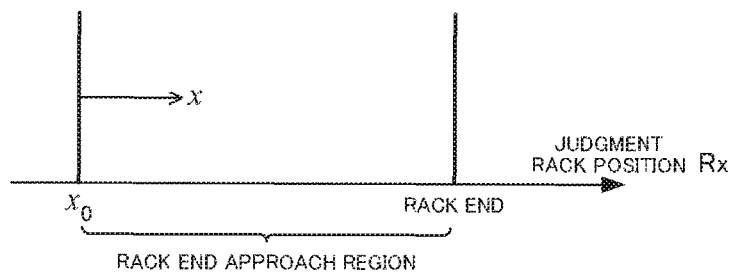
FIG. 4 is a diagram showing a characteristic example of a rack position converting section.

A rotational angle θ from a rotational angle sensor 21 is inputted into a rack position converting section 100 and is converted to a judgement rack position Rx. The judgement rack position Rx is inputted into a rack end approach judging section 110. As shown in FIG. 4, the rack end approach judging section 110 activates an end-hitting suppressing control function and outputs the rack displacement x and a switching signal SWS when the judgement rack position Rx is judged within a predetermined position $x_0$. The switching signal SWS and the rack displacement x are inputted into the viscoelastic model following control section 120 together with the rack axial force f. A rack axial force ff, which is control-calculated in the viscoelastic model following control section 120, is converted to the current command value Iref2 in a converting section 102. The current command value Iref2 is added to the current command value Iref1 in an adding section 103, and the added value is obtained as a current command value Iref3. The above described assist-control is performed based on the current command value Iref3.

As well, the predetermined position $x_0$ which sets a rack end approach region as shown in FIG. 4 enables to set an appropriate position. The predetermined position $x_0$ is not determined uniquely by using a rack ratio stroke, type of a vehicle, a feeling or the like, and normally sets at a front of the rack end whose range is 1 [mm] to 50 [mm].

The conversion from the rack axial force ff to the current command value Iref2 in the converting section 102 is performed based on the Equation 2.

$$Iref2 = ff/G1 \quad \text{[Equation 2]}$$

Figure 5:
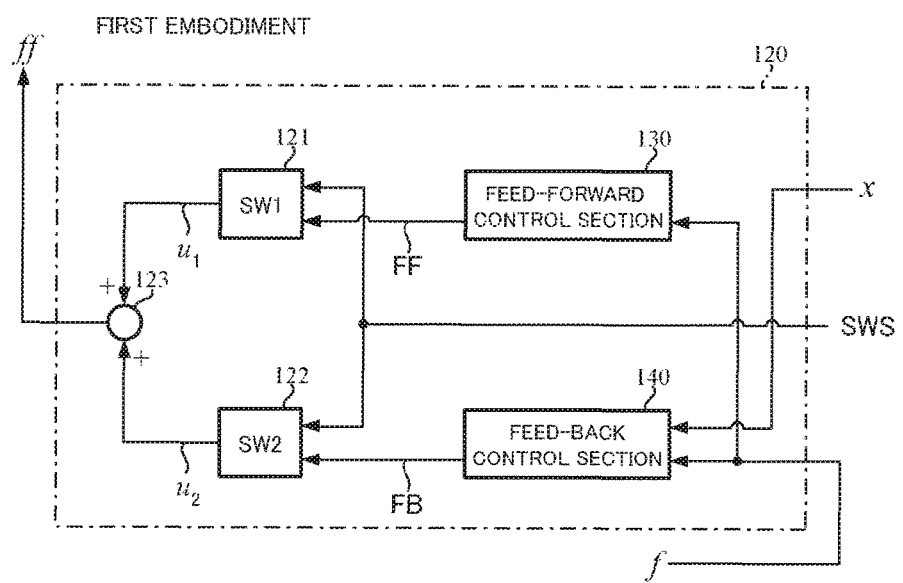
FIG. 5 is a block diagram showing a configuration example (the first embodiment) of a viscoelastic model following control section according to the present invention.
Figure 6:
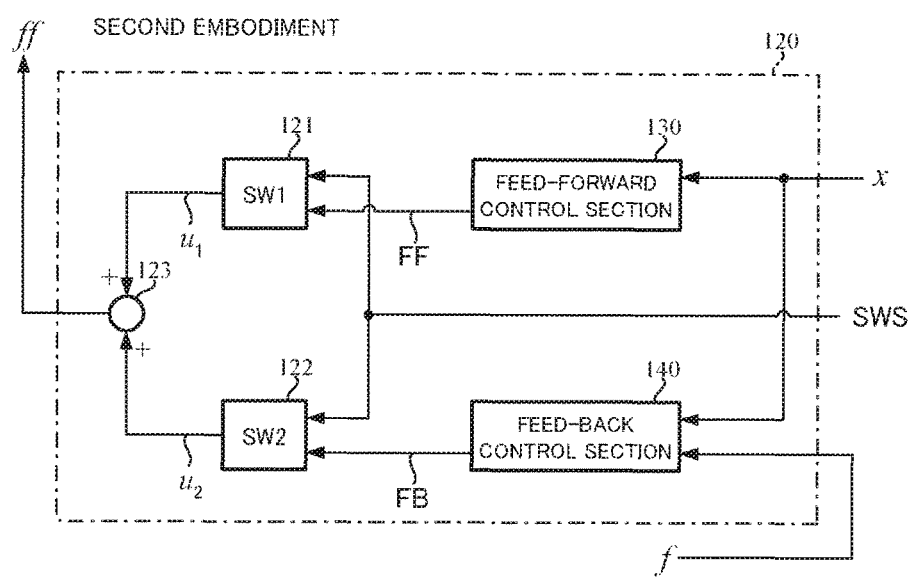
FIG. 6 is a block diagram showing a configuration example (the second embodiment) of a viscoelastic model following control section according to the present invention.

The detail of the viscoelastic model following control section 120 is shown in FIG. 5 or FIG. 6.

In the first embodiment shown in FIG. 5, the rack axial force f is inputted into a feed-forward control section 130 and a feed-back control section 140, and the rack displacement x is inputted into the feed-back control section 140. A rack axial force FF from the feed-forward control section 130 is inputted into a switching section 121, and a rack axial force FB from the feed-back control section 140 is inputted into a switching section 122. The switching sections 121 and 122 are switched-ON or -OFF by the switching signal SWS. When the switching sections 121 and 122 are switched-OFF by the switching signal SWS, each of outputs $u_1$ and $u_2$ is zero. When the switching sections 121 and 122 are switched-ON by the switching signal SWS, the rack axial force FF from the switching section 121 is outputted as a rack axial force $u_1$ and the rack axial force FB from the switching section 122 is outputted as a rack axial force $u_2$. The rack axial forces $u_1$ and $u_2$ from the switching section 121 and 122 are added in the adding section 123, and a rack axial force of the added value ff is outputted from the viscoelastic model following control section 120. The rack axial force ff is converted to the current command value Iref2 in the converting section 102.

Further, in the second embodiment shown in FIG. 6, the rack displacement x is inputted into a feed-forward control section 130 and a feed-back control section 140, and the rack axial force f is inputted into the feed-back control section 140. The following process is the same as that of the first embodiment, the rack axial force FF from the feed-forward control section 130 is inputted into the switching section 121, and the rack axial force FB from the feed-back control section 140 is inputted into the switching section 122. The switching sections 121 and 122 are switched-ON or -OFF by the switching signal SWS. When the switching sections 121 and 122 are switched-OFF by the switching signal SWS, each of outputs $u_1$ and $u_2$ is zero. When the switching sections 121 and 122 are switched-ON by the switching signal SWS, the rack axial force FF from the switching section 121 is outputted as the rack axial force $u_1$ and the rack axial force FB from the switching section 122 is outputted as the rack axial force $u_2$. The rack axial forces $u_1$ and $u_2$ from the switching section 121 and 122 are added in the adding section 123, and a rack axial force of the added value ff is outputted from the viscoelastic model following control section 120. The rack axial force ff is converted to the current command value Iref2 in the converting section 102.

In the above structures, an overall operation example is described with reference to a flowchart of FIG. 7, and then an operation example of the viscoelastic model following control (the first and second embodiments) is described with reference to a flowchart of FIG. 8.

In a start stage, the switching sections 121 and 122 are switched-OFF by the switching signal SWS. When the operation is started, the torque control section 31 calculates the current command value Iref1 based on the steering torque Th and the vehicle speed Vel (Step S10), and the rack position converting section 100 converts the rotational angle θ from the rotational angle sensor 21 to the judgement rack position Rx (Step S11). The rack end approach judging section 110 judges whether the rack position approaches near the rack end based on the judgement rack position Rx (Step S12). In a case that the rack position is not near the rack end, the rack axial force ff from the viscoelastic model following control section 120 is not outputted and normal steering control based on the current command value Iref1 is performed (Step S13). This control is continued to the end (Step S14).

On the other hand, in a case that the rack position is near the rack end, the viscoelastic model following control is performed in the viscoelastic model following control section 120 (Step S20). As shown in FIG. 8, the rack end approach judging section 110 outputs the switching signal SWS (Step S201) and the rack displacement x (Step S202). The converting section 101 converts the current command value Iref1 to the rack axial force f by using the Equation 1 (Step S203). In the first embodiment shown in FIG. 5, the feed-forward control section 130 performs the feed-forward control based on the rack axial force f (Step S204), and the feed-back control section 140 performs the feed-back control based on the rack displacement x and the rack axial force f (Step S205). Further, in the second embodiment shown in FIG. 6, the feed-forward control section 130 performs the feed-forward control based on the rack displacement x (Step S204), and the feed-back control section 140 performs the feed-back control based on the rack displacement x and the rack axial force f (Step S205). In both cases, the order of the feed-forward control and the feed-back control may be alternated.

The switching signal SWS from the rack end approach judging section 110 is inputted into the switching sections 121 and 122, and the switching sections 121 and 122 are switched-ON (Step S206). When the switching sections 121 and 122 are switched-ON, the rack axial force FF from the feed-forward control section 130 is outputted as the rack axial force $u_1$ and the rack axial force FB from the feed-back control 140 is outputted as the rack axial force $u_2$. The rack axial forces $u_1$ and $u_2$ are added in the adding section 123 (Step S207), and then the rack axial force ff which is the added result is converted to the current converting value Iref2 in the converting section 102 by using the Equation 2 (Step S208).

The viscoelastic model following control section 120 according to the present invention is a control system based on the physical model near the rack end, constitutes the model-following control which sets the viscoelastic model (a spring constant $k_0$ [N/m] and a viscous friction coefficient μ [N/(m/s)]) as the reference model (input: a force and output: the physical model which is described in the displacement), and attenuates the shock force at a time to hit to the rack end.

Figure 9:
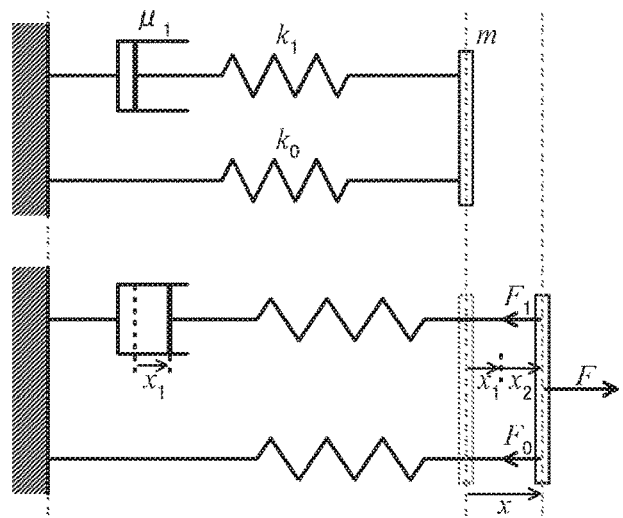
FIG. 9 is a schematic diagram of the viscoelastic model.

FIG. 9 is a schematic diagram near the rack end, and a relationship between mass m and forces $F_0$ and $F_1$ is represented by the Equation 3. The derivation of the equations of the viscoelastic model is described in, for example, "Elementary Mechanics for Elastic Membrane and Viscoelasticity" (Kenkichi OHBA) of "Engineering Sciences & Technology", Kansai University, official journal of a scientific society, Vol. 17 (2010).

$$F = m\ddot{x} + F_0 + F_1 \quad \text{[Equation 3]}$$

Assuming that spring constants $k_0$ and $k_1$ are defined for the rack displacements $x_1$ and $x_2$, respectively, and then the below Equations 4 to 6 are established.

$$x = x_1 + x_2 \quad \text{[Equation 4]}$$

$$F_0 = k_0 x \quad \text{[Equation 5]}$$

$$F_1 = \mu_1 \frac{dx_1}{dt} = k_1 x_2 \quad \text{[Equation 6]}$$

Therefore, the Equation 7 is obtained by substituting the Equation 3 to the Equations 4 to 6.

$$F = m\ddot{x} + k_0 x + k_1 x_2 \quad \text{[Equation 7]}$$
$$= m\ddot{x} + k_0 x + k_1(x - x_1) = m\ddot{x} + (k_0 + k_1)x - k_1 x_1$$

The Equation 8 is a result that the Equation 7 is differentiated, and then the Equation 9 is obtained by which the Equation 8 multiplies "$\mu_1/k_1$".

$$\dot{F} = m\dddot{x} + (k_0 + k_1)\dot{x} - k_1 \dot{x}_1 \quad \text{[Equation 8]}$$

$$\frac{\mu_1}{k_1}\dot{F} = \frac{\mu_1}{k_1}m\dddot{x} + \frac{\mu_1}{k_1}(k_0 + k_1)\dot{x} - \mu_1 \dot{x}_1 \quad \text{[Equation 9]}$$

Then, the Equation 10 is obtained by adding the Equations 7 and 9.

$$F + \frac{\mu_1}{k_1}\dot{F} = \quad \text{[Equation 10]}$$
$$m\ddot{x} + \frac{\mu_1}{k_1}m\dddot{x} + (k_0 + k_1)x - k_1 x_1 + \frac{\mu_1}{k_1}(k_0 + k_1)\dot{x} - \mu_1 \dot{x}_1$$

The Equation 11 is obtained by substituting the Equations 4 and 6 to the Equation 10.

$$F + \frac{\mu_1}{k_1}\dot{F} = m\ddot{x} + \frac{\mu_1}{k_1}m\dddot{x} + k_0 x + \mu_1(1 + k_0/k_1)\dot{x} \quad \text{[Equation 11]}$$

Here, $\mu_1/k_1 = \tau_e$, $k_0 = E_r$, and $\mu_1(1/k_0 + 1/k_1) = \tau_\delta$ are assumed, the Equation 11 can be expressed by the Equation 12. The Equation 13 is obtained by performing Laplace transform to the Equation 12.

$$F + \tau_e \dot{F} = \tau_e m \dddot{x} + m\ddot{x} + E_r(x + \tau_\delta \dot{x}) \quad \text{[Equation 12]}$$

$$(1 + \tau_e s)F(s) = \{\tau_e m s^3 + m s^2 + E_r(1 + \tau_\delta s)\}X(s) \quad \text{[Equation 13]}$$

The Equation 14 is obtained by summarizing the Equation 13 with "X(s)/F(s)".

$$\frac{X(s)}{F(s)} = \frac{1 + \tau_e s}{\tau_e m s^3 + m s^2 + E_r(1 + \tau_\delta s)} \quad \text{[Equation 14]}$$

The Equation 14 represents a third order physical model (transfer function) which indicates the characteristic from the input force f to the output displacement x. When the spring with the spring constant "$k_1=\infty$" is used, "$\tau_e \to 0$" is satisfied. Because of "$\tau_{67} = \mu_1 \cdot 1/k_0$", the Equation 15 which is a quadratic function is derived.

$$\frac{X(s)}{F(s)} = \frac{1}{m \cdot s^2 + \mu_1 \cdot s + k_0} \quad \text{[Equation 15]}$$

The quadratic function represented by the Equation 15 as the reference model Gm is described in the present invention. That is, a function represented by the Equation 16 is the reference model Gm. Here, "$\mu_1$" is equal to $\mu$ ($\mu_1 = \mu$).

$$Gm = \frac{1}{m \cdot s^2 + \mu \cdot s + k_0} \quad \text{[Equation 16]}$$

Next, an actual plant 146 of the electric power steering apparatus is represented by "P" which is denoted by the Equation 17. Then, when the reference model following control according to the present invention is designed by a two-degree-of-freedom control system, the system is a configuration of FIG. 10 expressed as actual models Pn and Pd. A block 143 (Cd) shows a control element section. (refer to, for example, Hajime MAEDA and Toshiharu SUGIE, "System Control Theory for Advanced Control", published by Asakura Shoten in Japan)

$$P = \frac{Pn}{Pd} = \frac{N}{D} = \frac{1}{m \cdot s^2 + \eta \cdot s} \quad \text{[Equation 17]}$$

In order to express the actual plant P with a ratio of a stable rational function, N and D are represented by the below Equation 18. A numerator of "N" is that of "P", and a numerator of "D" is a denominator of "P". However, "$\alpha$" is determined such that a pole of "$(s+\alpha)=0$" can be selected arbitrary.

$$N = \frac{1}{(s+\alpha)^2}, D = \frac{m \cdot s^2 + \eta \cdot s}{(s+\alpha)^2} \quad \text{[Equation 18]}$$

When the reference model Gm is applied to the configuration of FIG. 10, it is necessary to set "1/F" as the below Equation 19 in order to satisfy "x/f=Gm". As well, the Equation 19 is derived from the Equations 16 and 18.

$$\frac{1}{F} = GmN^{-1} = \frac{(s+\alpha)^2}{m \cdot s^2 + \mu \cdot s + k_0} \quad \text{[Equation 19]}$$

A block N/F of the feed-back control section is represented by the below Equation 20.

$$\frac{N}{F} = \frac{1}{m \cdot s^2 + \mu \cdot s + k_0} \quad \text{[Equation 20]}$$

A block D/F of the feed-forward control section is represented by the below Equation 21.

$$\frac{D}{F} = \frac{m \cdot s^2 + \eta \cdot s}{m \cdot s^2 + \mu \cdot s + k_0} \quad \text{[Equation 21]}$$

In an example of the two-degree-of-freedom control system shown in FIG. 10, an input (the current command value corresponding to the rack axial force or the column axial torque) u to the actual plant P is represented by the below Equation 22.

$$u = u_1 + u_2 = \frac{D}{F}f + C_d e = \frac{D}{F}f + \left(\frac{N}{F}f - x\right)C_d \quad \text{[Equation 22]}$$

Further, an output (the rack displacement) x of the actual plant P is represented by the below Equation 23.

$$x = uP = P\frac{D}{F}f + P\left(\frac{N}{F}f - x\right)C_d = P\frac{D}{F}f + P\frac{N}{F}C_d f - PC_d x \quad \text{[Equation 23]}$$

When the Equation 23 is summarized and the term of the output x and the term of the left-hand side f are arrangees to the right-hand side, the below Equation 24 is derived.

$$(1 + PC_d)x = P\left(\frac{D}{F} + \frac{N}{F}C_d\right)f \quad \text{[Equation 24]}$$

The below Equation 25 is obtained by expressing the Equation 24 as the transfer function of the output x against the input f. Here, the actual plant P is expressed as "P=Pn/Pd" after the third term.

$$\frac{x}{f} = \frac{P\left(\frac{D}{F} + \frac{N}{F}C_d\right)}{1 + PC_d} =$$

$$\frac{\frac{Pn}{Pd}\left(\frac{D}{F} + \frac{N}{F}C_d\right)}{1 + \frac{Pn}{Pd}C_d} = \frac{\frac{D}{F} + \frac{N}{F}C_d}{\frac{Pd}{Pn} + C_d} = \frac{Pn}{F}\frac{NC_d + D}{PnC_d + Pd} \quad \text{[Equation 25]}$$

If the actual plant P is correctly expressed, it is possible to obtain the relations "Pn=N" and "Pd=D". The below Equation 26 is obtained from the Equation 25 since the characteristics of the output x against the input f is represented as "Pn/F (=N/F)".

$$\frac{x}{f} = \frac{Pn}{F}\frac{PnC_d + Pd}{PnC_d + Pd} = \frac{Pn}{F} \quad \text{[Equation 26]}$$

The characteristic of the output x against the input f (the reference model (the transfer function)) is considered as the Equation 27.

$$\frac{x}{f} = \frac{\omega_n^2}{s + 2\zeta\omega_n s + \omega_n^2} \quad \text{[Equation 27]}$$

It is possible to achieve the Equation 26 by putting "1/F" to the below Equation 28.

$$\frac{1}{F} = \frac{\omega_n^2}{s + 2\zeta\omega_n s + \omega_n^2} Pn^{-1}$$ [Equation 28]

Figure 10:
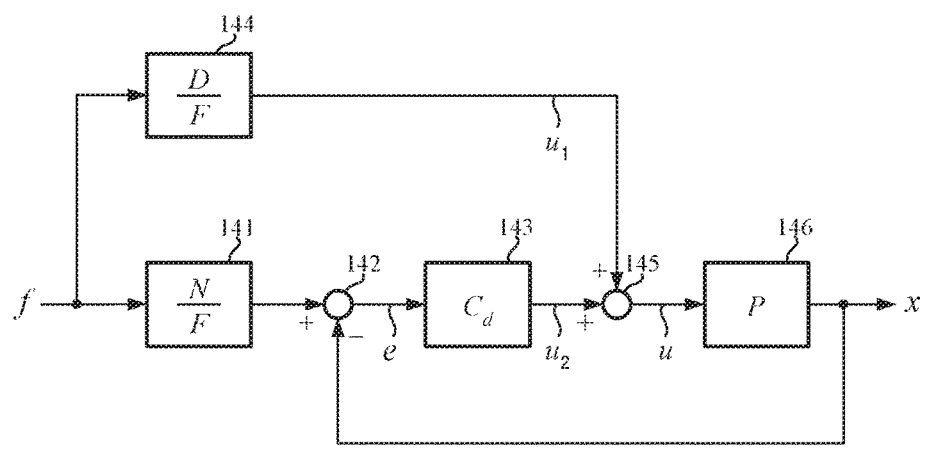
FIG. 10 is a block diagram showing detailed principle of the viscoelastic model following control section.
Figure 11A:
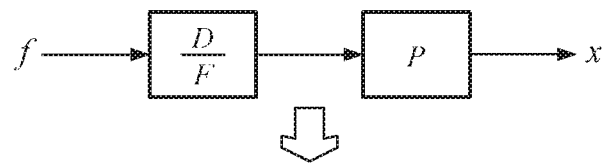
FIGS. 11A, 11B and 11C are block diagrams showing detailed principle of the viscoelastic model following control section.
Figure 11B:
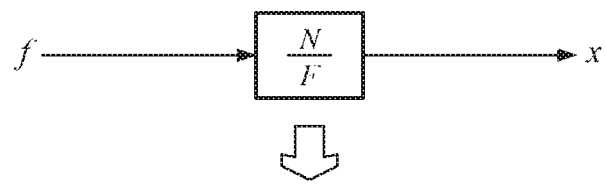
Figure 11C:
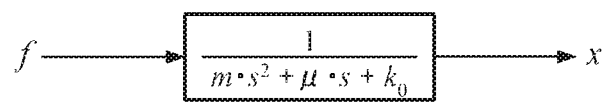

In FIG. 10, when the feed-forward control system is considered as a path of "a block 144→the actual plant P", this system is expressed as FIGS. 11A, 11B and 11C. Here, considering P as N/D (P=N/D), FIG. 11A can be expressed as FIG. 11B, and then FIG. 11C is obtained by using the Equation 20. Since an equation "f=(m·s²+μ·s+k₀)x" is satisfied from FIG. 11C, the below Equation 29 is obtained by performing an inverse Laplace transform to the equation "f=(m·s²+μ·s+k₀)x".

$$f = m\ddot{x} + \mu\dot{x} + k_0 x$$ [Equation 29]

Figure 12:
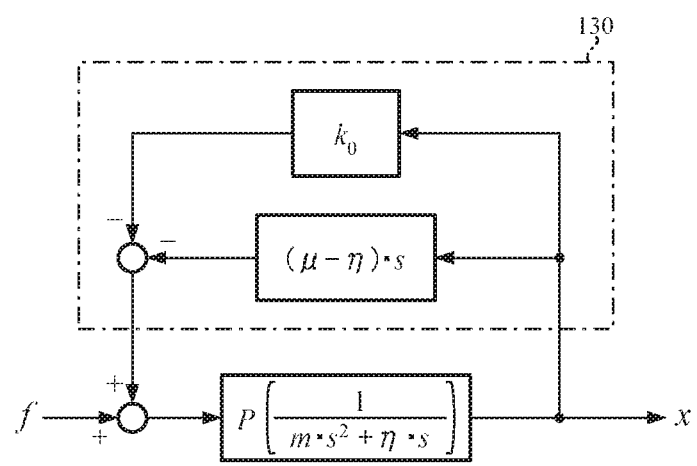
FIG. 12 is a block diagram showing detailed principle of the viscoelastic model following control section.

On the other hand, considering a transfer function block of the feed-forward control system as shown in FIG. 12, the below Equation 30 is satisfied in the input f and the output x.

$$\{f - (\mu - \eta) \cdot s \cdot x - k_0 x\} \frac{1}{m \cdot s^2 + \eta \cdot s} = x$$ [Equation 30]

The below Equation 31 is obtained by summarizing the Equation 30, and the below Equation 32 is derived by summarizing the Equation 31 with respect to the input f.

$$f - \{(\mu-\eta) \cdot s + k_0\} \cdot x = (m \cdot s^2 + \eta \cdot s) x$$ [Equation 31]

$$f = \{m \cdot s^2 + (\mu-\eta+\eta) \cdot s + k_0\} \cdot x$$ [Equation 32]

Figure 13:
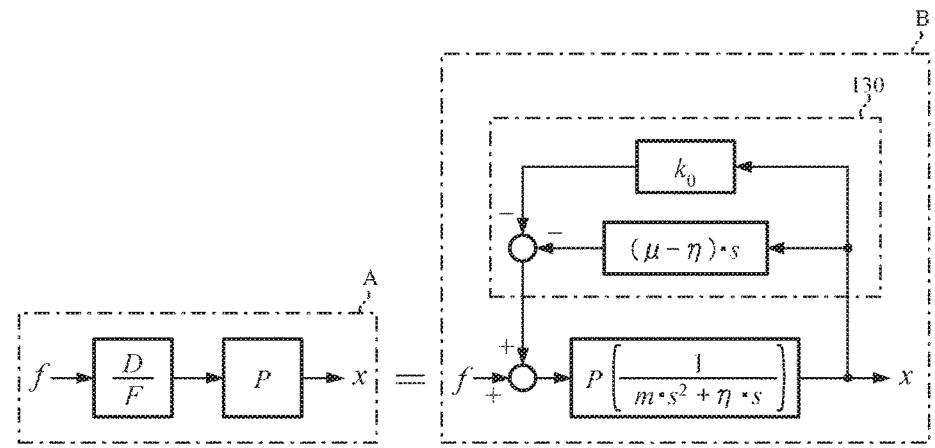
FIG. 13 is a block diagram showing detailed principle of the viscoelastic model following control section.

The above Equation 29 is obtained by performing the inverse Laplace transform on the Equation 32. Consequently, the feed-forward control sections A and B are equivalent each other as shown in FIG. 13.

Figure 14:
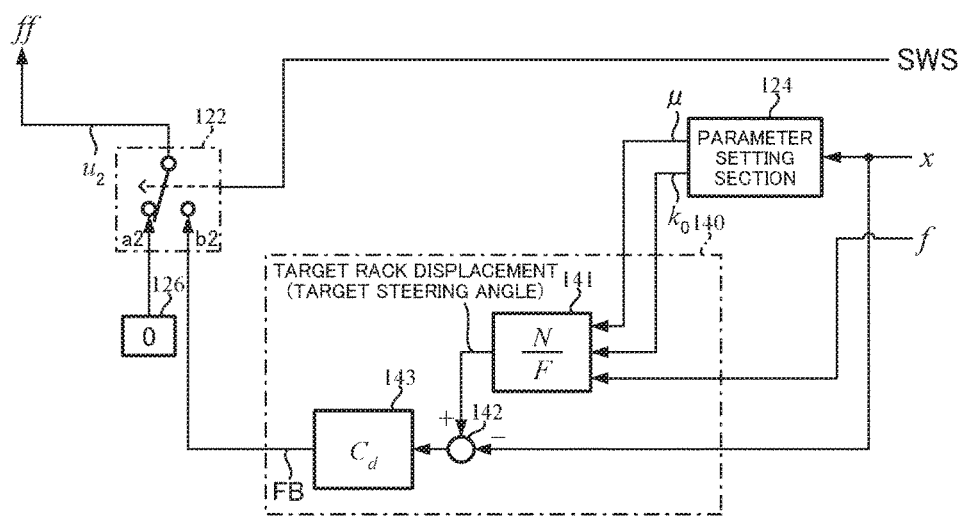
FIG. 14 is a block diagram showing a detailed configuration example (the third embodiment) of a viscoelastic model following control section according to the present invention.
Figure 15:
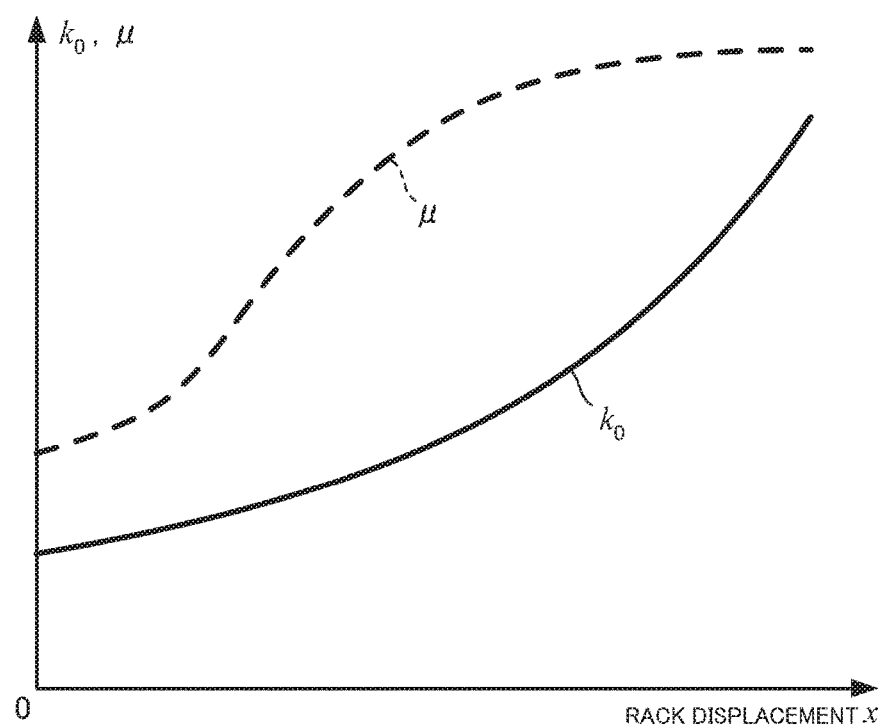
FIG. 15 is a diagram showing an example of changing parameters of a reference model depending on a rack position.

Considering the above-described premise, a problem of operation does not occur without the feed-forward control section 130, and the configuration of the viscoelastic model following control section 120 in this case is shown in FIG. 14 (the third embodiment). That is, the feed-back control section 140 comprises the feed-back element (N/F) 141 which has the spring constant $k_0$ and the viscous friction coefficient μ as the parameters and calculates a target rack displacement (a target steering angle) based on the rack axial force f, the subtracting section 142 which obtains the position deviation between the target rack displacement and the rack displacement x, and the control element section 143 which includes a PID (Proportional-Integral-Differential), a PI (Proportional-Integral) or the like that control-processes the rack axial force FB based on the position deviation. The rack axial force FB from the feed-back control section 140, i.e. the output of the control element section 143 is inputted into a contact point b2 of the switching section 122. The fixed value "0" from the fixing section 126 is inputted into the contact point a2 of the switching section 122. The rack axial force f is inputted into the feed-back element 141, and then the rack displacement x is subtracting-inputted into the subtracting section 142 in the feed-back control section 140 and is inputted into the parameter setting section 124. The parameter setting section 124 outputs the spring constant $k_0$ and the viscous friction coefficient μ against the rack displacement x with the characteristics as shown in FIG. 15, and the spring constant $k_0$ and the viscous friction coefficient μ are inputted into the feed-back element section 141. The contacts of the switching section 122 are switched to the contact point a2 or the contact point b2 by using the switching signal SWS from the rack end approach judging section 120.

Figure 16:
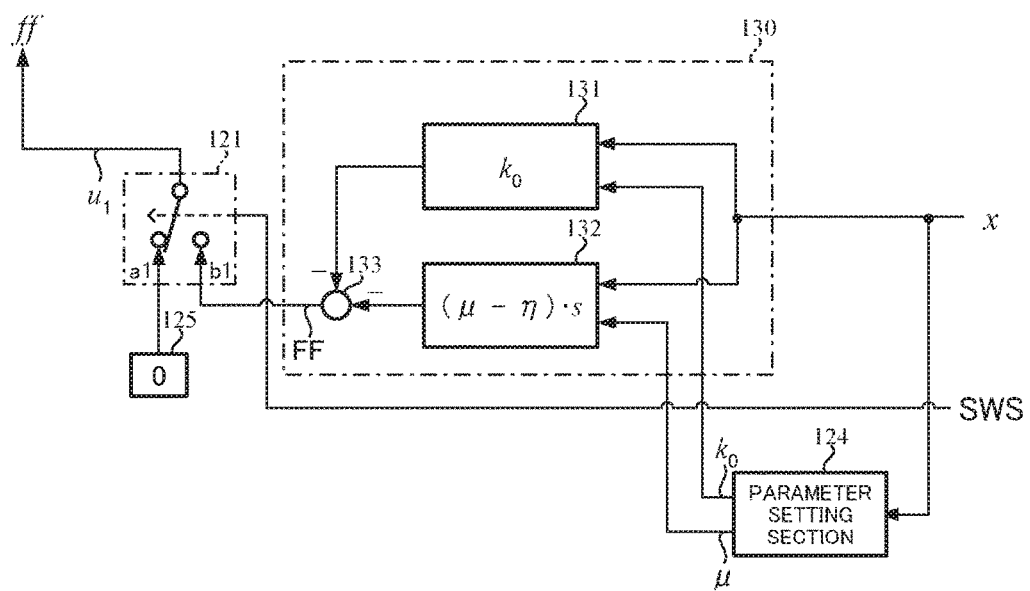
FIG. 16 is a block diagram showing a detailed configuration example (the fourth embodiment) of a viscoelastic model following control section according to the present invention.

Further, the system (the fourth embodiment) as shown in FIG. 16 may include only the feed-forward control section 130.

The present invention changes the model parameters of the reference model (the feed-back element 141) in the above third embodiment or the control parameters of the control element section, or the both parameters based on the rack axial force (SAT (Self-Aligning-Torque)) f and the rack displacement x. That is, when the model parameters of the reference model and the control parameters (the gains) of the control system are appropriately set against, for example, the road surface state of the asphalt, these parameters may not be appropriate against the ice surface, the snow surface or the like. In a case that the friction coefficient is small, the margin in which the large assist force can be generated toward the rack end is large, the steering angle greatly leads and the possibility to reach at the rack end progresses. It is desired the following system: the smaller the rack axial force at a time when the steering angle enters within the predetermined angle range is, the larger a spring constant of the viscoelastic model is and the higher the control gain is, and therefore the steering lead-angle is small. Consequently, the electric power steering apparatus according to the present invention comprises various correcting sections being capable of enlarging the spring constant and the control gain as the rack axial force is small.

Figure 17:
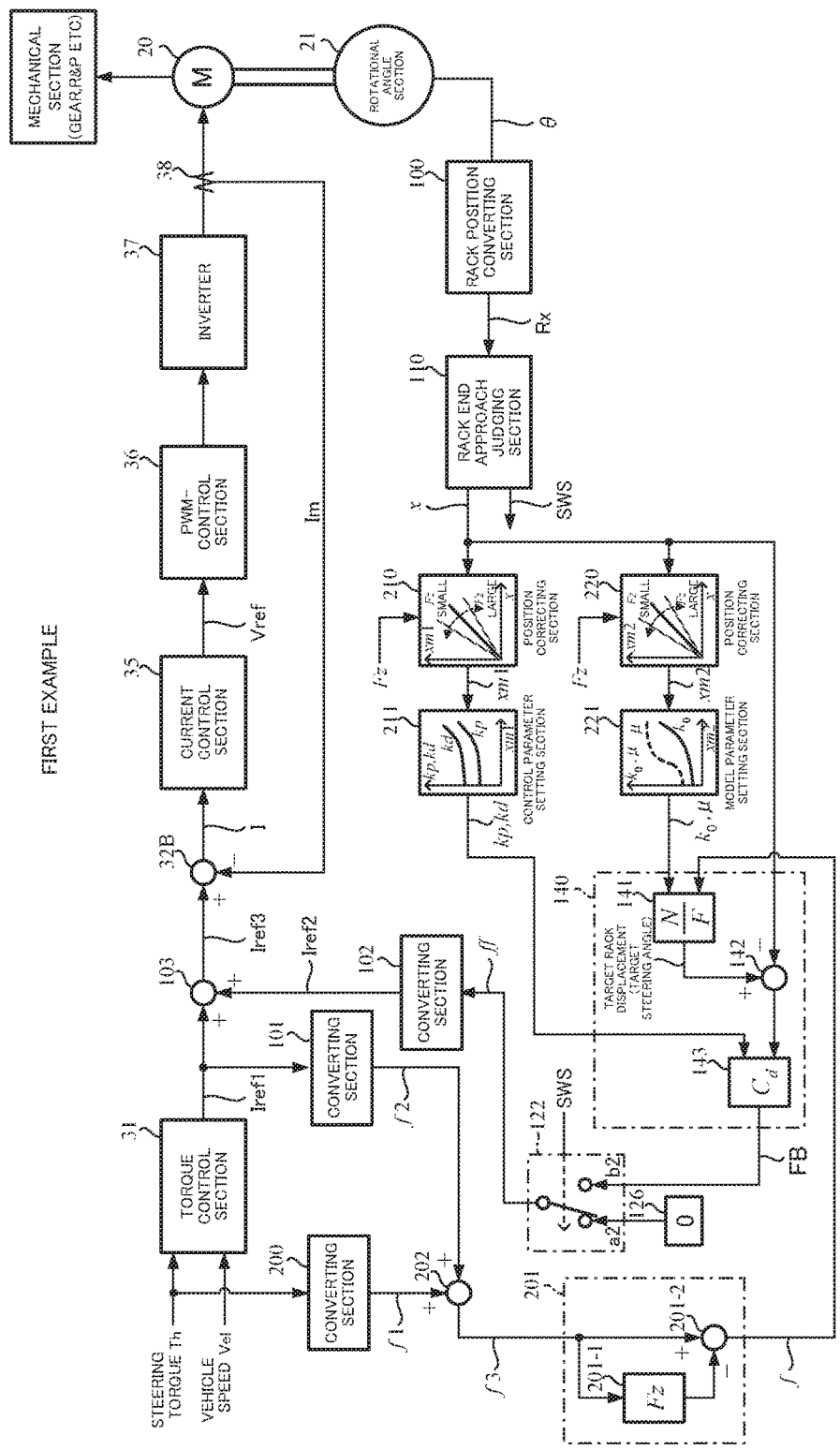
FIG. 17 is a block configuration diagram of the first example according to the present invention.

FIG. 17 shows the first example according to the present invention corresponding to FIG. 3 and FIG. 14, and the apparatus comprises a converting section 200 to convert from the steering torque Th to the rack axial force f1, an adding section 202 to add the rack axial force f1 and the rack axial force f2 from the converting section 101, an axial force calculating section 201 to calculate the input rack axial force f from the rack axial force f3 (=f1+f2) which is obtained from the adding section 202, a position correcting section 210 and a control parameter setting section 211 of the control system, and a position correcting section 220 and a model parameter setting section 221 of the model system.

The axial force calculating section 201 to input the rack axial force f3 (=f1+f2) comprises a setting storing section 201-1 to set and store the rack axial force f3 when the rack displacement x becomes within the predetermined angle range as an initial rack axial force Fz, and a subtracting section 201-2 to output the input-side rack axial force f obtained by subtracting the initial rack axial force Fz from the rack axial force f3 hereinafter. The initial rack axial force Fz is a rack axial force when the rack displacement x is within the predetermined angle range, and the initial rack axial force Fz is inputted into the position correcting sections 210 and 220 as a parameter. The axial force calculating section 201 calculates the input-side rack axial force f based on the below Equation 33 after the rack displacement x is within the predetermined angle region.

$$f = (f1 + f2) - Fz$$ [Equation 33]

Figure 18:
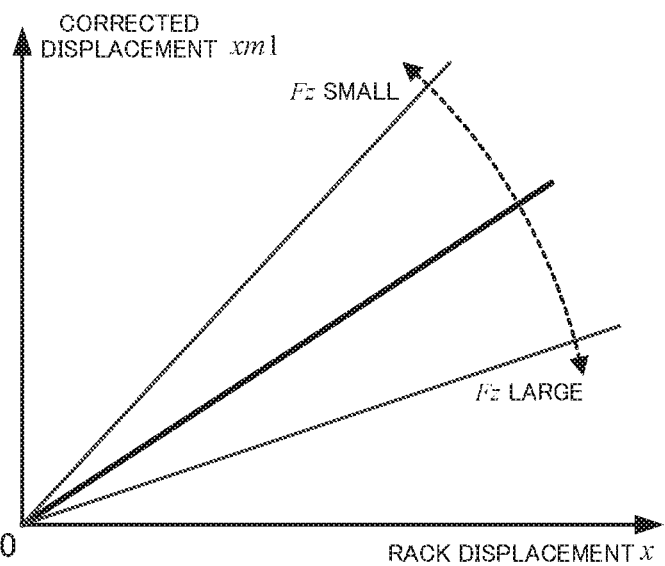
FIG. 18 is a characteristic diagram showing a sensitive characteristic example of a position correcting section in a control system of the first example.
Figure 19:
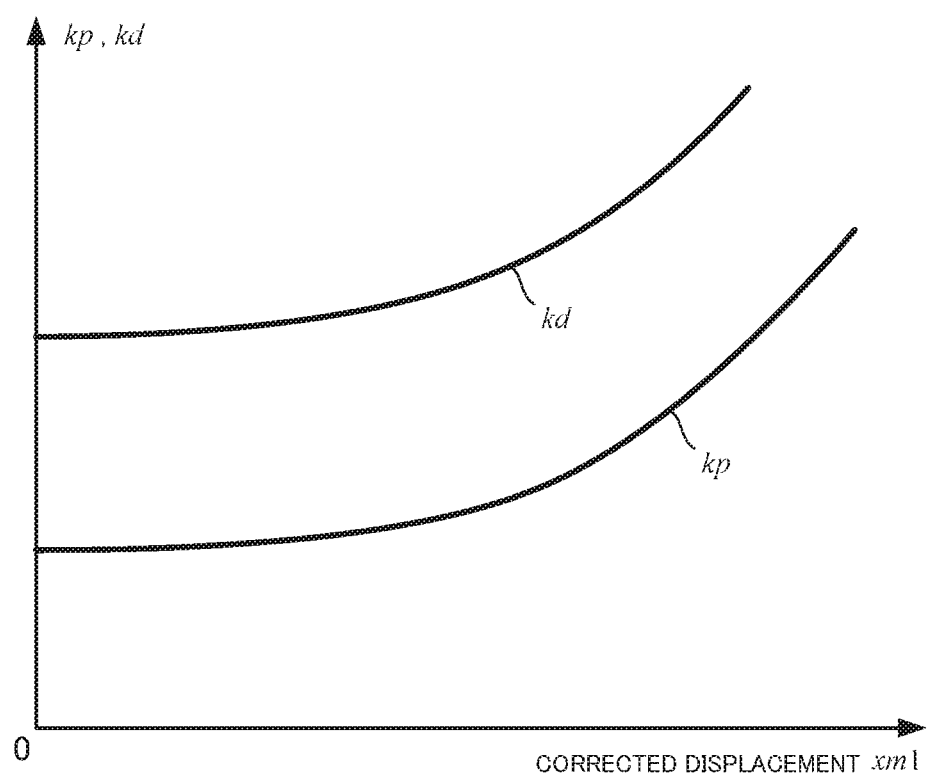
FIG. 19 is a characteristic diagram showing a characteristic example of a control parameter setting section of the first example.

The characteristic of the position correcting section 210 is almost linear to the rack displacement x and has an outputting relationship that the gradient of the corrected displacement xm1 increases as the initial rack axial force Fz is smaller, for example, as shown in FIG. 18. The control parameter setting section 211 inputs the corrected displacement xm1 from the position correcting section 210 and outputs the control parameters kd and kp with a nonlinear relationship that the gradient rate of the increasing is larger as the corrected displacement xm1 is larger, for example, as shown in FIG. 19. The control parameters kd and kp are set by using the below Equation 34 in the control element section 143 of the feed-back control section 140.

$$Cd = kp + kd \cdot s \quad \text{[Equation 34]}$$

Figure 20:
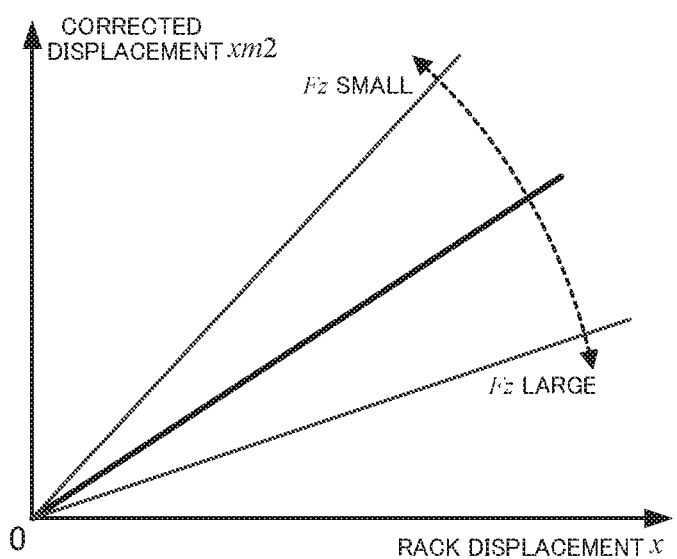
FIG. 20 is a characteristic diagram showing a sensitive characteristic example of a position correcting section in a model system of the first example.

The characteristic of the position correcting section 220 is almost linear to the rack displacement x and has an outputting relationship that the gradient of the corrected displacement xm2 increases as the initial rack axial force Fz is smaller, for example, as shown in FIG. 20. The model parameter setting section 221 inputs the corrected displacement xm2 from the position correcting section 220 and outputs the model parameters $\mu$ (the viscous friction coefficient) and $k_0$ (the spring constant), for example, as shown in FIG. 15. The model parameters $\mu$ and $k_0$ are set in the feed-back element (N/F) 141 of the feed-back control section 140.

The model parameters and the control parameters of the reference model are changed by apparently increasing or decreasing the rack displacement x in response to the rack axial force Fz in the position correcting sections 210 and 220. In this way, it is possible to adjust the characteristic that the steering angle leads to the rack end.

Figure 21:
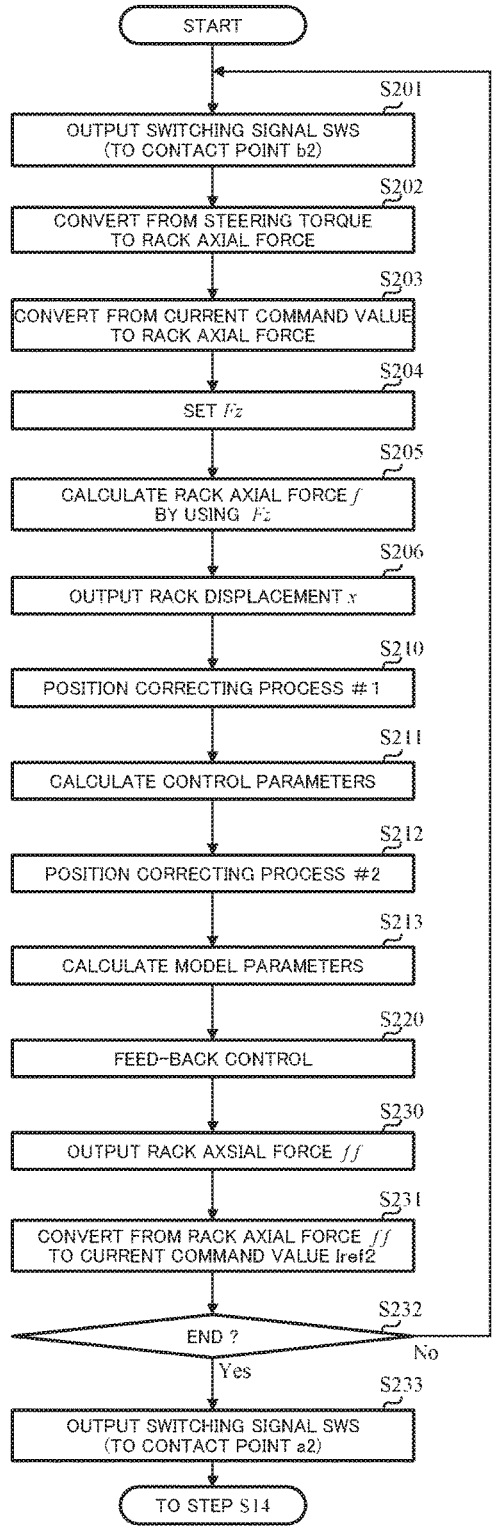
FIG. 21 is a flowchart showing an operation example of the first example according to the present invention.

In such the configuration, the operation example of the first example will be described with reference to flowcharts of FIGS. 21 and 22.

When the switching signal SWS is outputted from the rack end approach judging section 110, the contacts of the switching section 122 are switched from the contact point a2 to the contact point b2 (Step S201) and the steering torque Th is converted to the rack axial force f1 in the converting section 200 (Step S202). The current command value Iref1 is calculated in the torque control section 31, and the current command value Iref1 is converted to the rack axial force f2 in the converting section 101 (Step S203). Just when the switching section 122 is switched to the contact point b2, the rack axial force f3 is set in the setting storing section 201-1 as the initial rack axial force Fz (Step S204). Thereafter, the rack axial force f is calculated by subtracting the stored initial rack axial force Fz from the rack axial force f3 in the subtracting section 201-2 (Step S205), and the rack axial force f is inputted into the feed-back element 141 in the feed-back control section 140 as the input-side rack axial force.

Further, the rack displacement x is outputted from the rack end approach judging section 110 (Step S206), and the rack displacement x is subtracting-inputted into the subtracting section 142 in the feed-back control section 140 and is inputted into the position correcting sections 210 and 220. The position correcting section 210 calculates the corrected displacement xm1 with the position correcting process #1 based on the rack displacement x and the initial rack axial force Fz (Step S210), and the control parameter setting section 211 calculates the control parameters kp and kd based on the corrected displacement xm1 (Step S211). The control parameters kp and kd are set in the control element section 143 of the feed-back control section 140. The position correcting section 220 calculates the corrected displacement xm2 with the position correcting process #2 based on the rack displacement x and the initial rack axial force Fz (Step S212), and the model parameter setting section 221 calculates the model parameters $\mu$ and $k_0$ based on the corrected displacement xm2 (Step S213). The model parameters $\mu$ and $k_0$ are set in the control element section 141 of the feed-back control section 140.

The feed-back control section 140 performs a feed-back control by using the rack axial force f, the rack displacement x, the set control parameters kp and kd and the model parameters $\mu$ and $k_0$ (Step S220), and outputs the output-side rack axial force ff (Step S230). The rack axial force ff is converted to the current command value Iref2 in the converting section 102 (Step S231), and this process is repeated to the end (Step S232).

Figure 7:
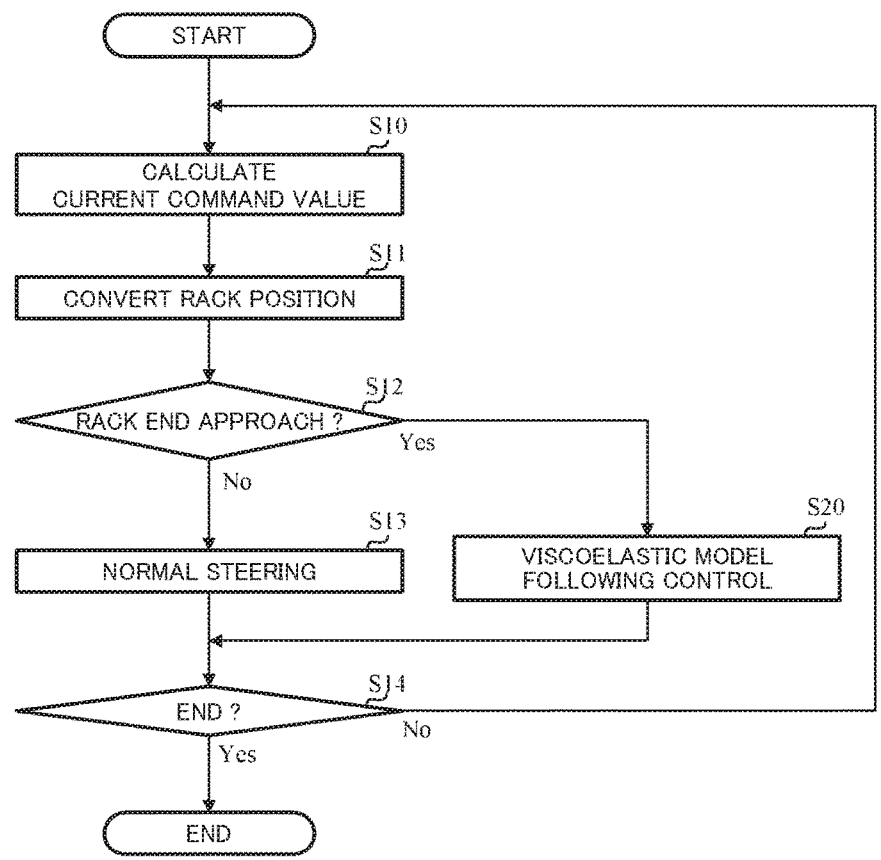
FIG. 7 is a flowchart showing an operation example (overall) of the present invention.
Figure 8:
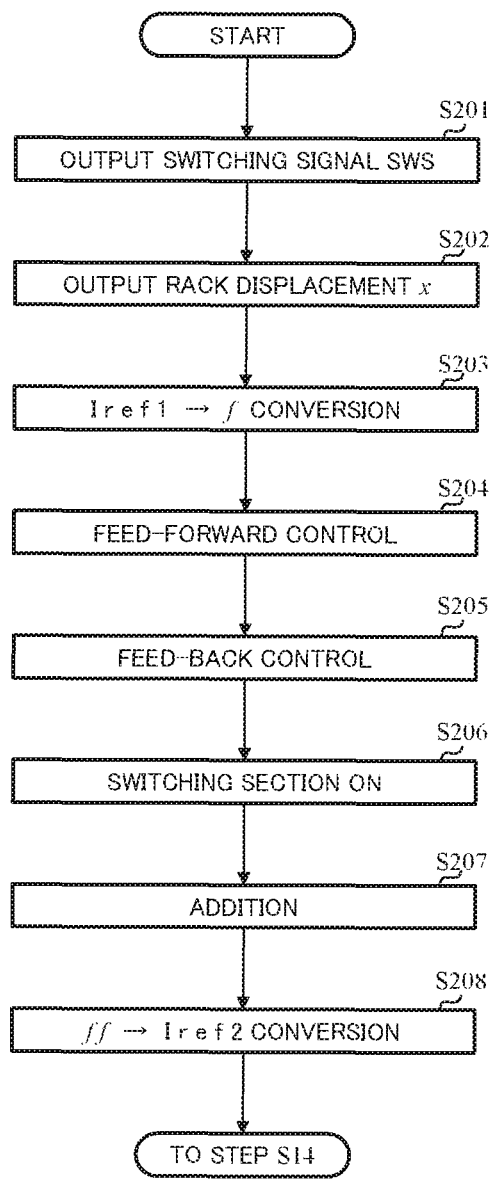
FIG. 8 is a flowchart showing an operation example of the viscoelastic model following control section.

When the process is ended in the above Step S232, the contacts of the switching section 122 are switched from the contact point b2 to the contact point a2 due to the output of the switching signal SWS (Step S233), and then the process is proceeded to the Step S14 of FIG. 7.

Figure 22:
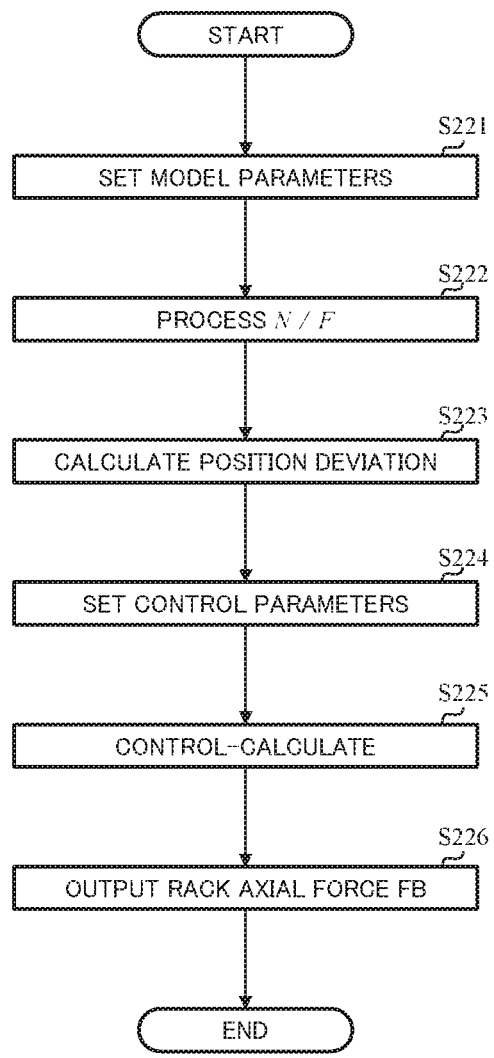
FIG. 22 is a flowchart showing an operation example of a feed-back control of the first example.

The process of the feed-back control in the feed-back control section 140 is performed with the operation as shown in FIG. 22.

First, the model parameters $\mu$ and $k_0$ calculated in the model parameter setting section 221 are set in the feed-back element 141 (Step S221), the N/F-process is performed in the feed-back element 141, and the target rack displacement (the target steering angle) is calculated (Step S222). The target rack displacement is adding-inputted into the subtracting section 142, the position deviation is calculated by subtracting the subtracting-inputted rack displacement x from the target rack displacement (Step S223), and the calculated position deviation is inputted into the control element section 143. Further, the control parameters kp and kd calculated in the control parameter setting section 211 are set in the control element section 143 (Step S224), a control calculation is performed (Step S225), and the control-calculated rack axial force FB is outputted (Step S226). As well, the setting order of the control parameters kp and kd is alternative.

Figure 23:
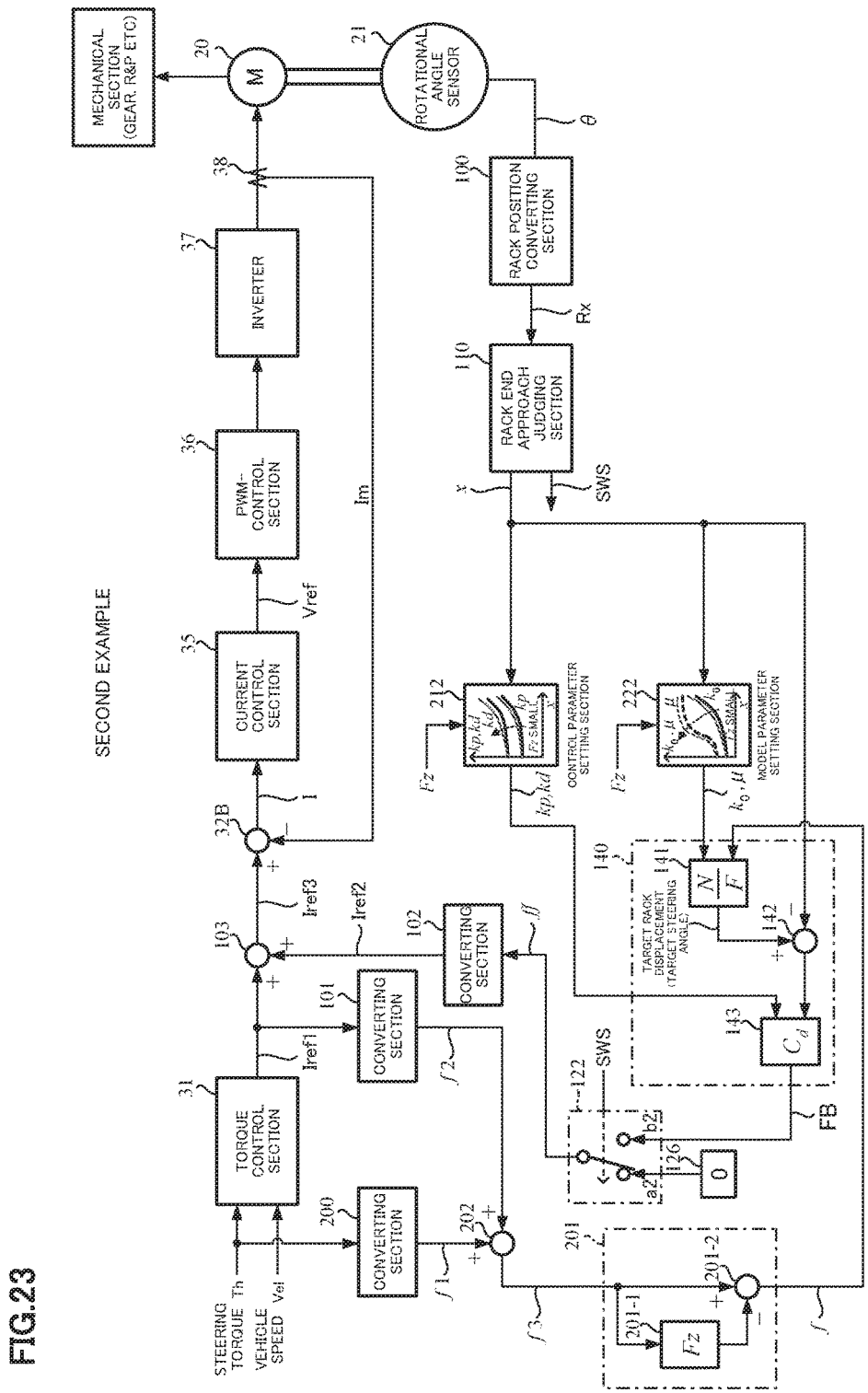
FIG. 23 is a block configuration diagram of the second example according to the present invention.
Figure 24:
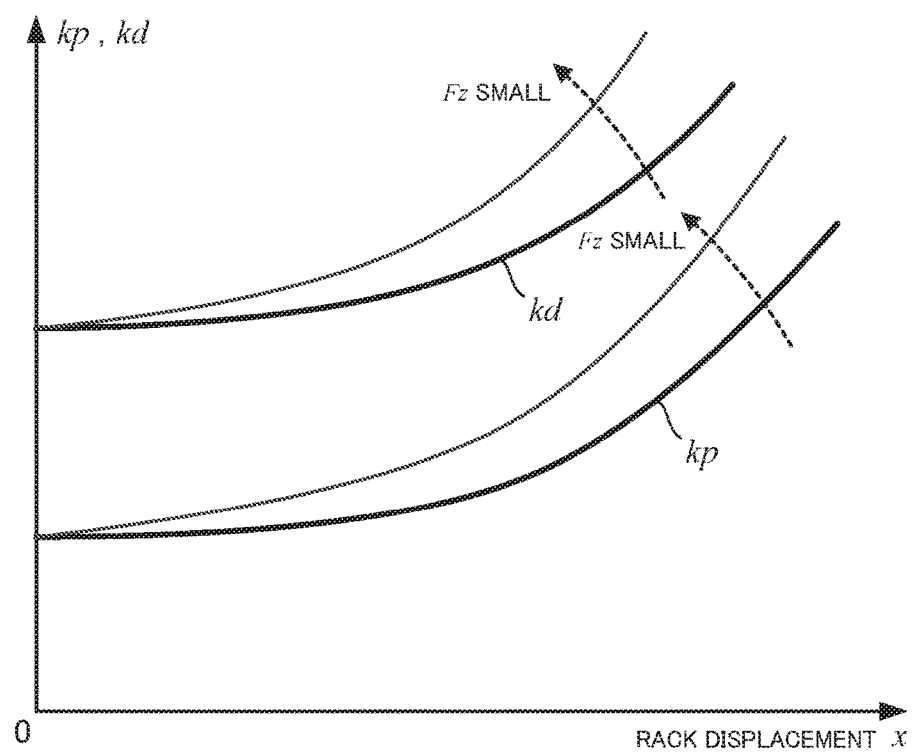
FIG. 24 is a characteristic diagram showing a characteristic example of a control parameter setting section of the second example.
Figure 25:
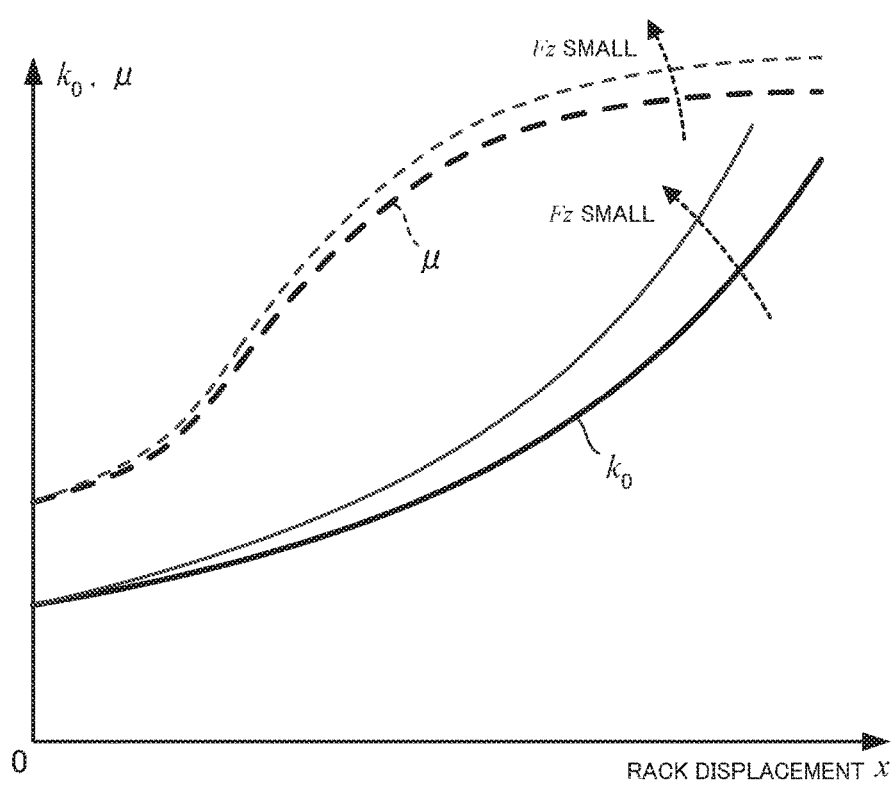
FIG. 25 is a characteristic diagram showing a sensitive characteristic example of a position correcting section in a model system of the second example.

Next, the second example according to the present invention will be described with reference to FIG. 23. In the second example, the position correcting sections 210 and 220 are eliminated from the configuration of the first example and the initial rack axial force Fz is inputted into the control parameter setting section 212 and the model parameter setting section 222 as the parameters. As shown in FIG. 24, the characteristic of the control parameter setting section 212 is that the increasing rates of the control parameters kp and kd are larger as the initial rack axial force Fz is smaller. Further, as shown in FIG. 25, the characteristic of the model parameter setting section 222 is that the increasing rates of the model parameters $\mu$ and $k_0$ are larger as the initial rack axial force Fz is smaller, and the model parameters $\mu$ and $k_0$ are respectively represented by the functions $f_1$ and $f_2$ of the below Equation 35.

$$\mu = f_1(Fz \cdot x)$$

$$k_0 = f_2(Fz \cdot x) \quad \text{[Equation 35]}$$

Figure 26:
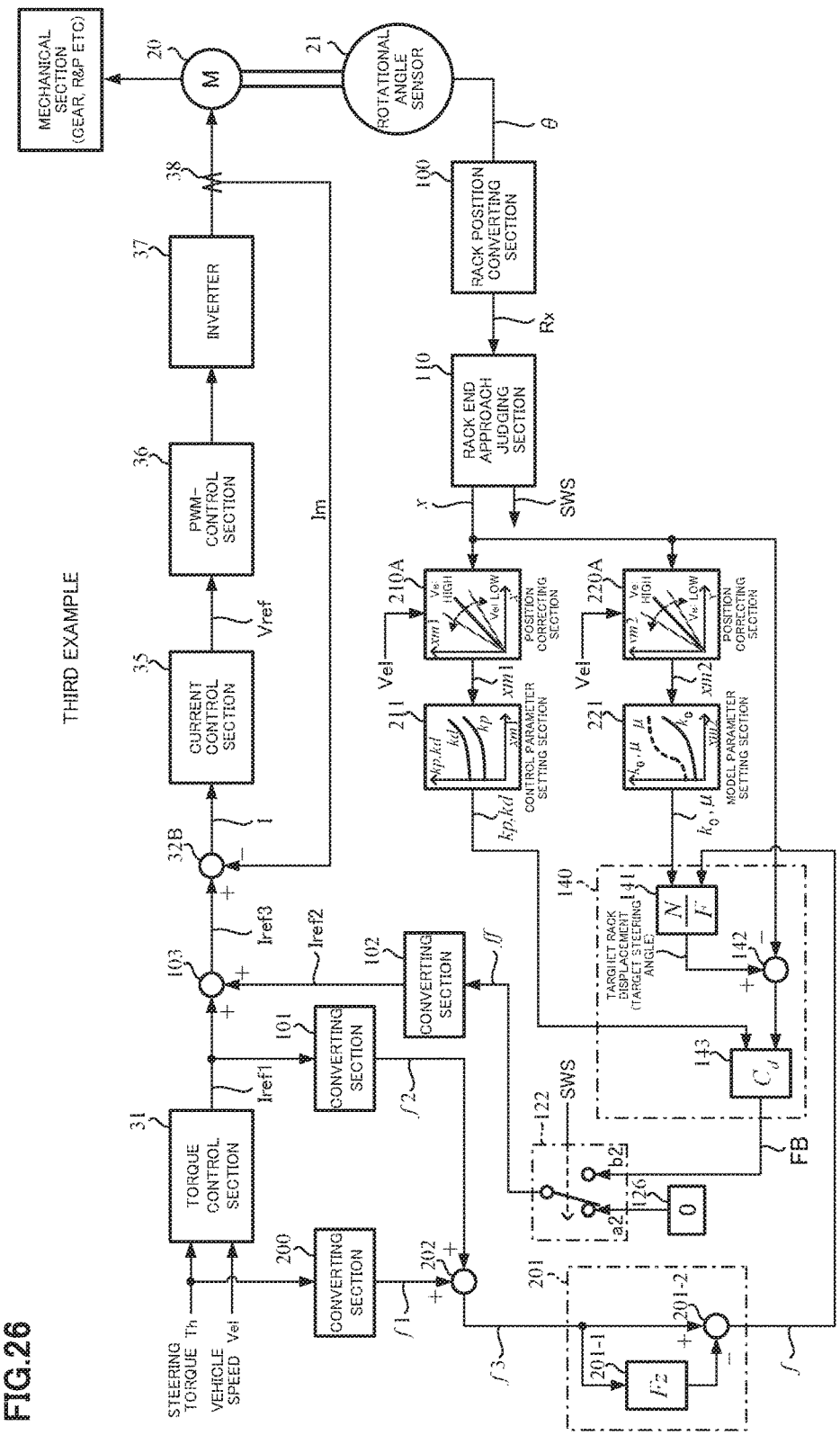
FIG. 26 is a block configuration diagram of the third example according to the present invention.
Figure 27:
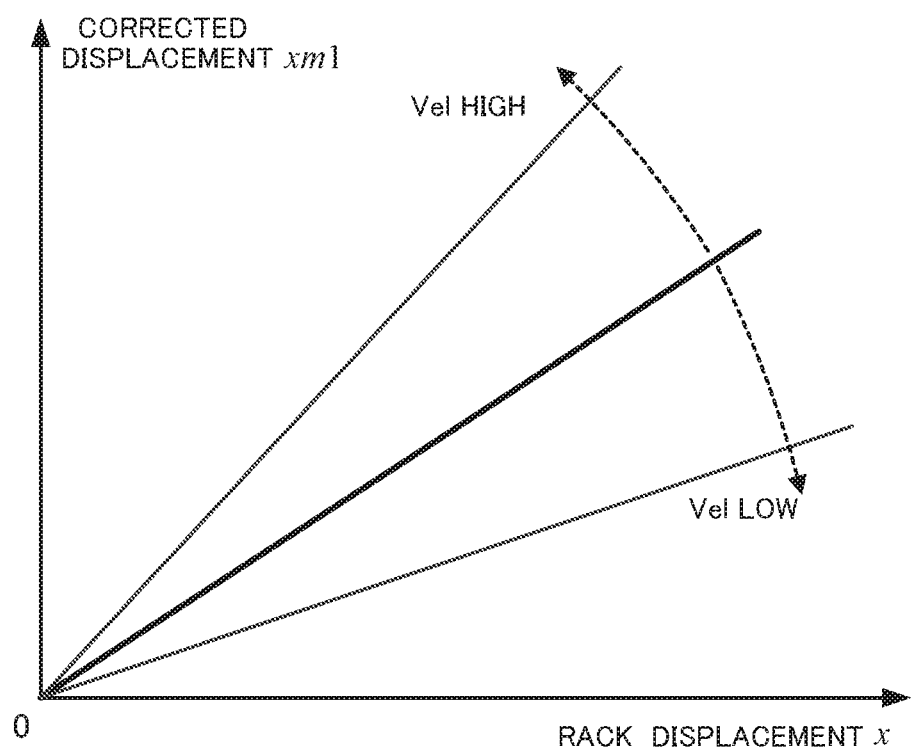
FIG. 27 is a characteristic diagram showing a sensitive characteristic example of a position correcting section in a control system of the third example.
Figure 28:
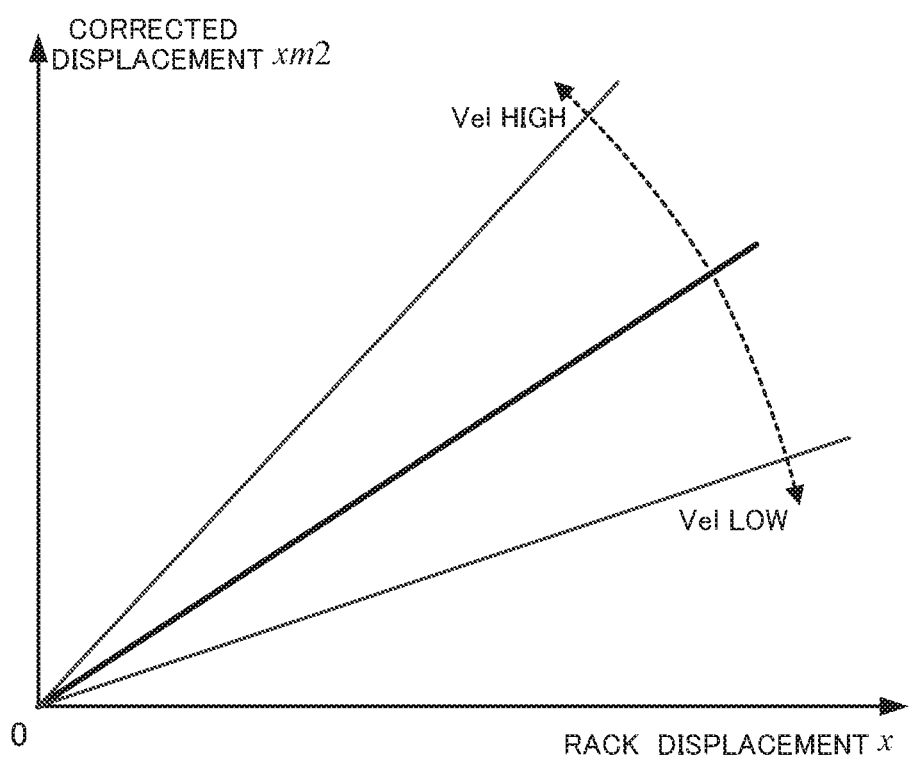
FIG. 28 is a characteristic diagram showing a sensitive characteristic example of a position correcting section in a model system of the third example.

The third example according to the present invention is shown in FIG. 26, and the vehicle speed Vel is inputted into the position correcting sections 210A and 220A as a parameter. The position correcting section 210A variably corrects the rack displacement x such that the corrected displacement xm1 is larger as the vehicle speed Vel is higher as shown in FIG. 27, and the position correcting section 220A variably corrects the rack displacement x such that the corrected displacement xm2 is larger as the vehicle speed Vel is higher as shown in FIG. 28.

The model parameters of the reference model and the control parameters are changed by apparently increasing or decreasing the rack displacement x in response to the vehicle speed Vel in the position correcting sections 210A and 220A. The characteristic of the rack axial force Fz in a creeping driving is different from that in vehicle stationary (parking), and a magnitude in the creeping driving is small to the steering angle and the gradient is also small. In this way, it is possible to adjust the characteristic that the steering angle leads to the rack end.

Figure 29:
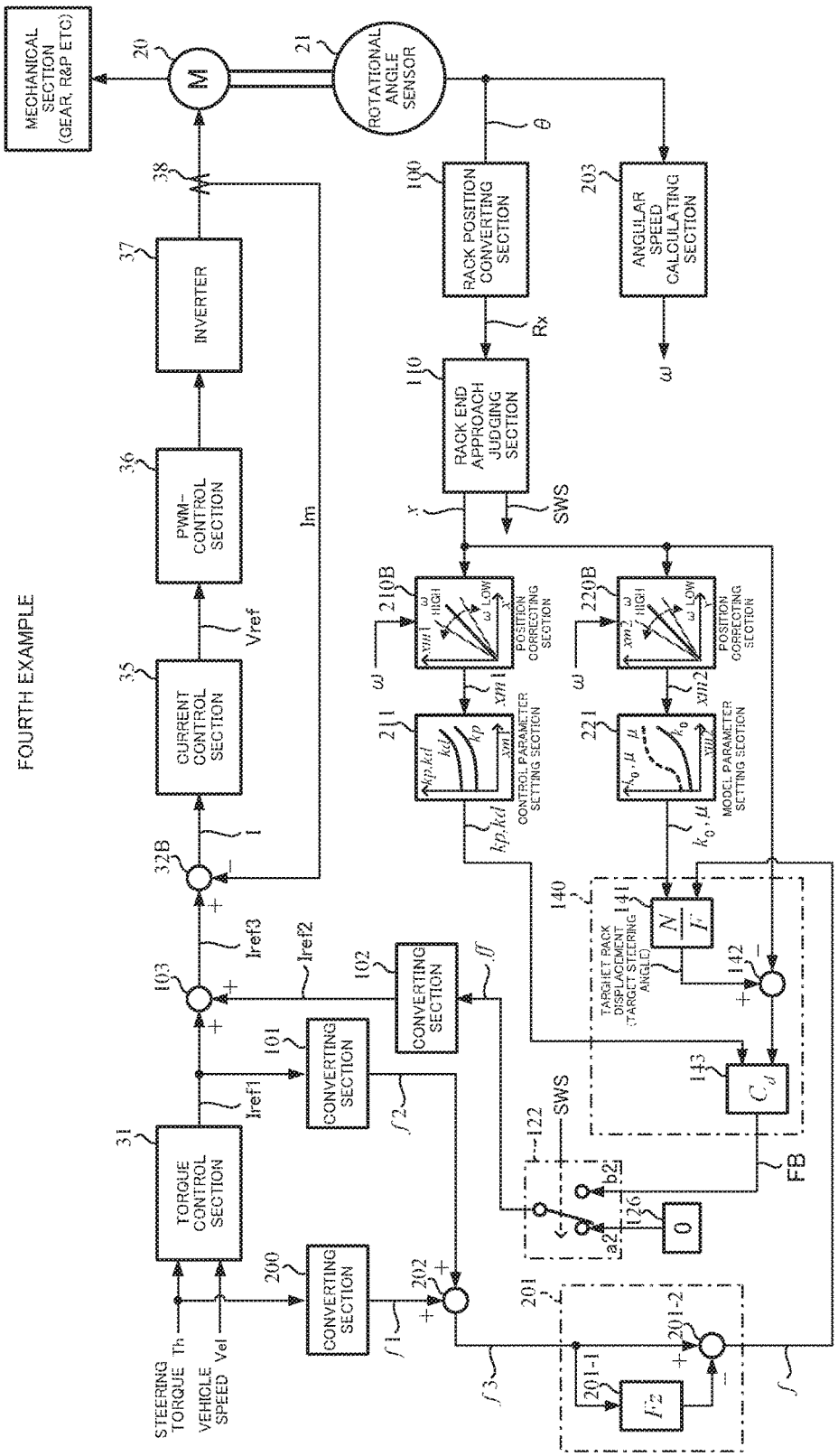
FIG. 29 is a block configuration diagram of the fourth example according to the present invention.
Figure 30:
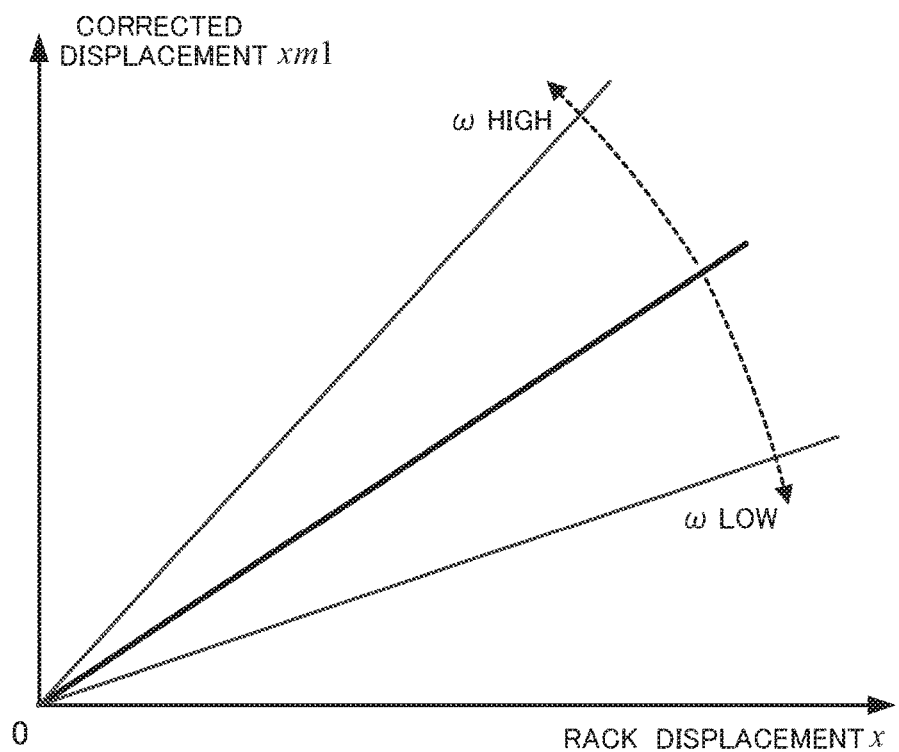
FIG. 30 is a characteristic diagram showing a sensitive characteristic example of a position correcting section in a control system of the fourth example.
Figure 31:
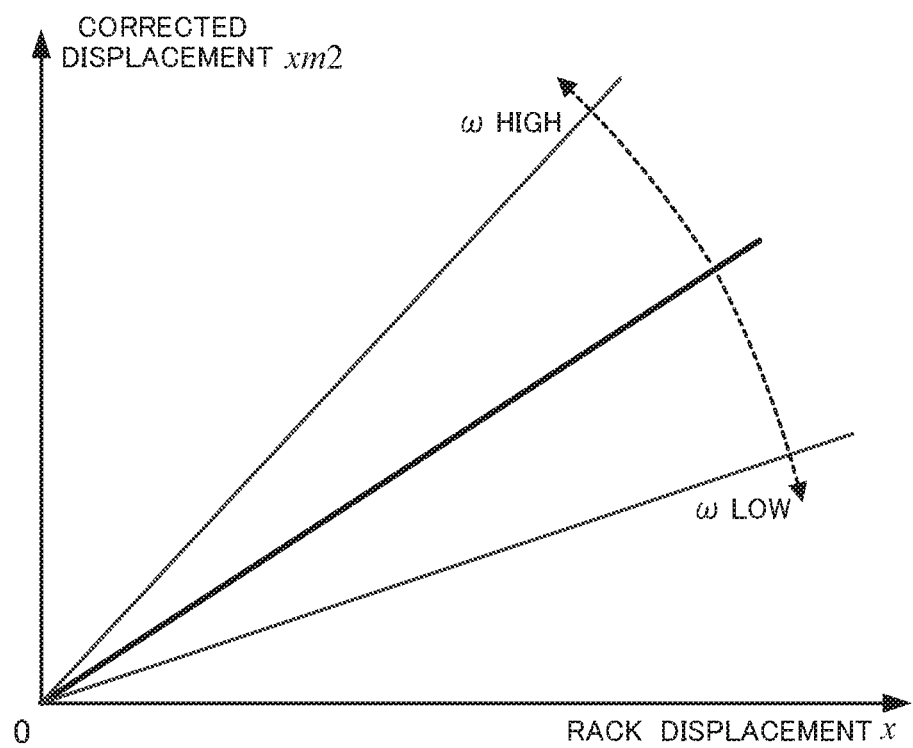
FIG. 31 is a characteristic diagram showing a sensitive characteristic example of a position correcting section in a model system of the fourth example.

FIG. 29 shows the fourth example according to the present invention, and a motor angular velocity ω is inputted into the position correcting sections 210B and 220B as a parameter. The motor angular velocity ω is calculated (differentiated) from the rotational angle θ in the angular velocity calculating section 203. The position correcting section 210B variably corrects the rack displacement x such that the corrected displacement xm1 is larger as the motor angular velocity ω is larger as shown in FIG. 30, and the position correcting section 220B variably corrects the rack displacement x such that the corrected displacement xm2 is larger as the motor angular velocity ω is larger as shown in FIG. 31.

The model parameters of the reference model and the control parameters are changed by apparently increasing or decreasing the rack displacement x in response to the motor angular velocity ω (the rack displacement velocity) in the position correcting sections 210B and 220B. In a case that the rack displacement velocity ω (the motor angular velocity) is large, the spring term and damping of the reference model are enlarged when the velocity to the rack end is high so that the reference model output is not larger toward the rack end. The rack displacement does not lead toward the rack end by enlarging the control parameters (the gains). It is possible to adjust the characteristic that the steering angle leads to the rack end by correcting the position correcting sections 210B and 220B in response to the motor angular velocity (the rack displacement velocity) ω.

Further, in the above-described examples according to the present invention, there is provided a configuration of the model following control that the reference model is the viscoelastic model within the predetermined angle at the front of the rack end. In addition to that the model parameters of the viscoelastic model and the control parameters (the control gains) are variable within the predetermined angle range, the model parameters and the control parameters are also variable in response to the rack axial force when the rack position enters within the predetermined angle region. For example, the spring term of the viscoelastic model and the control gain are set small near the start steering angle and they are set large as the rack position approaches to the rack end. When the rack position enters within the predetermined angle, the smaller the rack axial force is, the larger the spring term and the control gain are set. Thus, the control variable near the start steering angle can be small and the change amount of the assist amount within and out of the predetermined angle range becomes small. In this way, the driver does not feel uncomfortable for a reaction force due to the change of the assist amount. Since the control gain is set large and the controlled variable is large at a region near the rack end, the shock force can be attenuated when the steering position reaches at the rack end.

Figure 32:
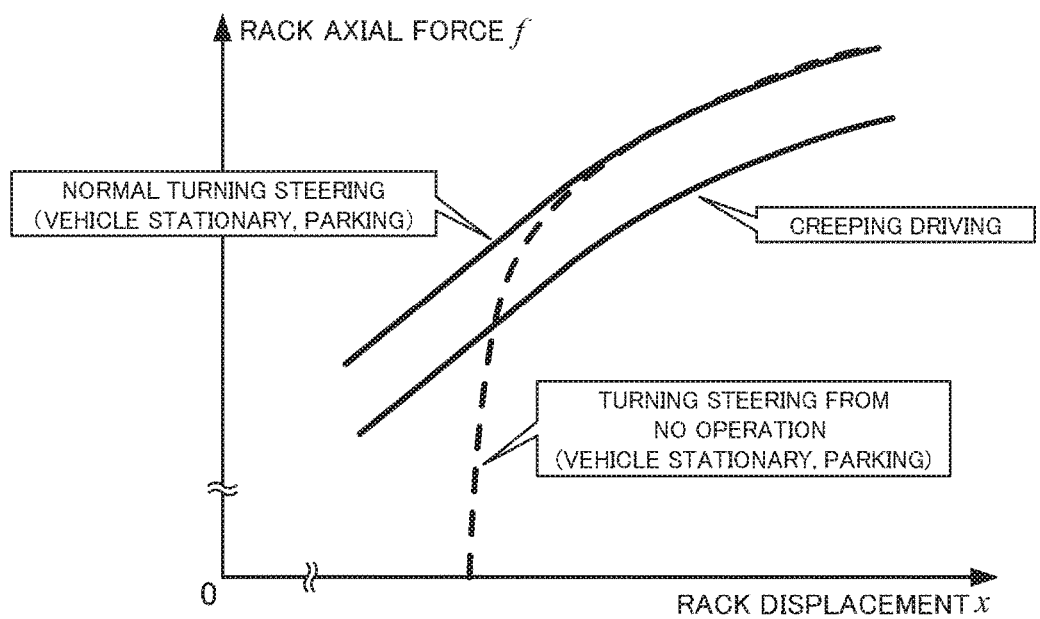
FIG. 32 is a characteristic diagram showing a characteristic example of a reaction force (a rack axial force) in a driving state.

Furthermore, the rack axial force within the predetermined angle region is varied depending on the road surface state (the asphalt, the wet road surface, the ice surface, the snow surface or the like). The rack axial force is small in a case (the ice surface or the snow surface) that a friction coefficient of the road surface is small, and it is large since the surface friction coefficient is large on the asphalt road. As shown in FIG. 32, since the reaction force from the tire at vehicle stationary (parking) is different from that during a driving in the creeping speed, the rack axial force varies. In addition, the load characteristic is also different due to the degree of torsion of the tire. It is desired that the steering angle is controlled at almost constant irrespective of the road surface state and the driving state. In order to accomplish the above desired control, the positive and negative maximum values of the input of the rack axial force to the reference model are limited in the present invention (the fifth to seventh examples). By setting the limiting value to limit the input, the reference model output (the target steering angle) becomes constant and therefore the dispersion of the control effect is suppressed. Further, by adjusting the limiting value depending on the rack axial force, it is possible to adjust the reference model output (the target steering angle) and the dispersion of the effect can further be small.

Figure 33:
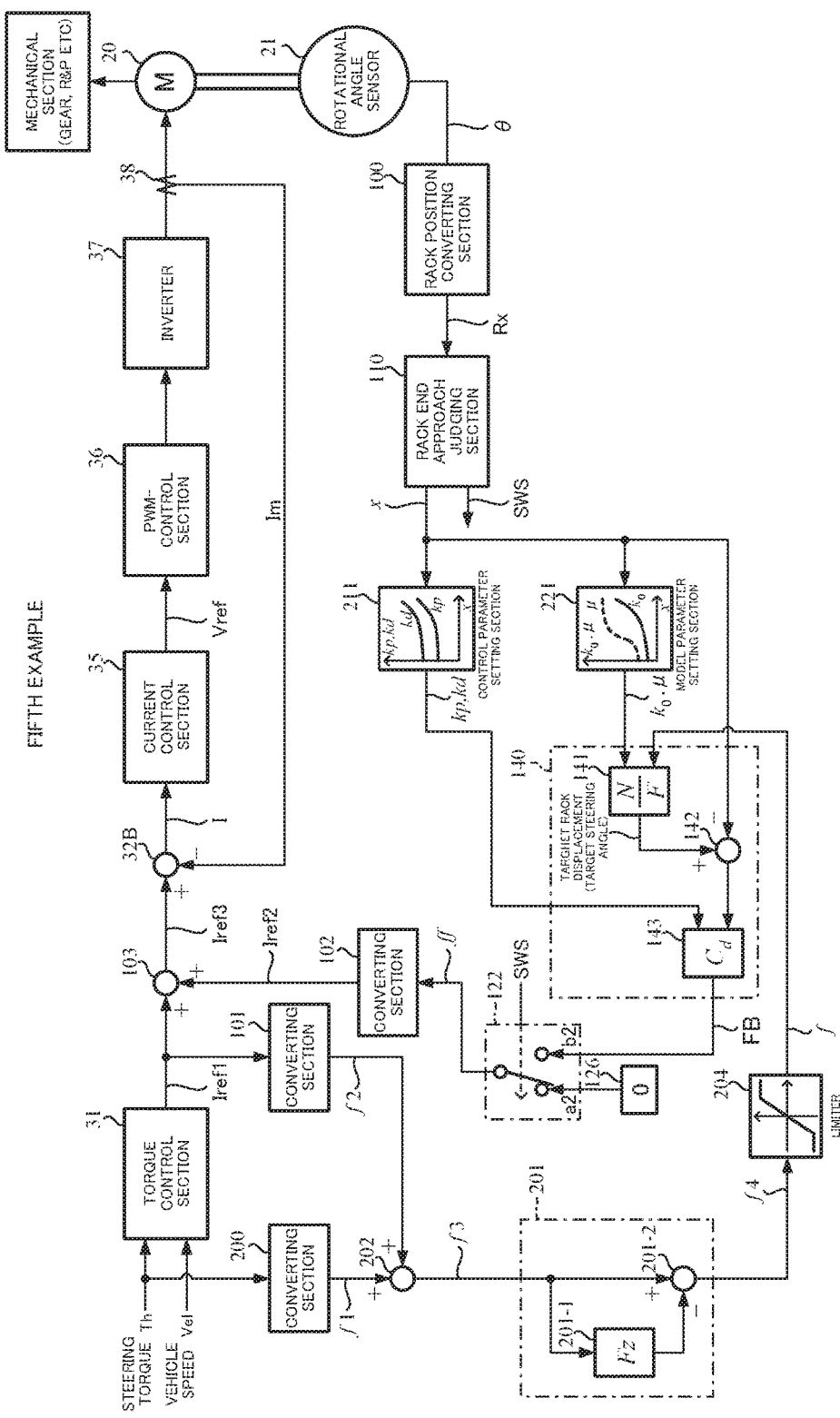
FIG. 33 is a block configuration diagram of the fifth example according to the present invention.

FIG. 33 shows the fifth example according to the present invention in corresponding to FIG. 3 and FIG. 14, and there are provided the converting section 200 to convert from the steering torque Th to the rack axial force f1, the adding section 202 to add the rack axial force f1 and the rack axial force f2 from the converting section 101, the axial force calculating section 201 to calculate the input-side rack axial force f4 from the rack axial force f3 (=f1+f2) which is obtained from the adding section 202, the limiter 204 to output the inputting rack axial force f by limiting the maximum value of the rack axial force f4 from the axial force calculating section 201, the control parameter setting section 211 to set the control parameters of the control system, and the model parameter setting section 221 to set the model parameters of the model system.

The axial force calculating section 201 to input the rack axial force f3 (=f1+f2) comprises the setting storing section 201-1 to set and store the rack axial force f3 when the rack displacement x is the predetermined angle region as the initial rack axial force Fz, and the subtracting section 201-2 to output the rack axial force f4 obtained by subtracting the initial rack axial force Fz from the rack axial force f3 hereinafter. The initial rack axial force Fz is a rack axial force when the rack displacement x is the predetermined angle region, and the axial force calculating section 201 calculates the rack axial force f4 by using the Equation 33 when the rack displacement x is within the predetermined angle region (however, f=f4 in this example). This is because the output of the reference model is set "0" and the rack axial force FB which is outputted from the control element section 143 is set "0" in the predetermined angle. This is also due to eliminate the level difference of the command value in the steering near the predetermined angle and to easily achieve the steering holding.

Figure 34:
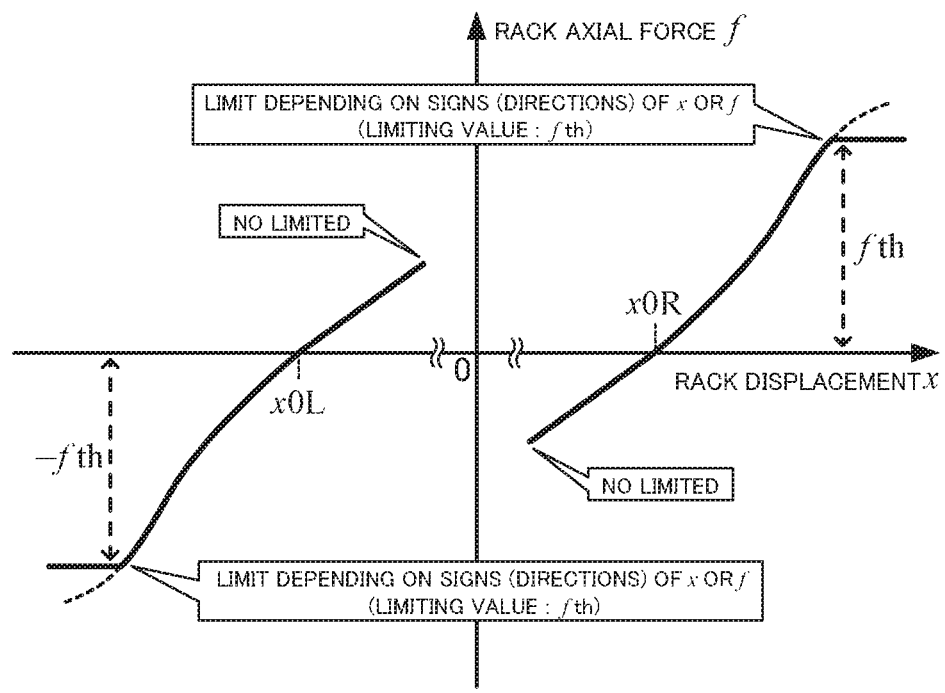
FIG. 34 is a characteristic diagram showing a characteristic example of a limiter.

The limiter 204 limits the positive and negative maximum values with the characteristic as shown in FIG. 34, and the input-side rack axial force f whose maximum value is limited is inputted into the feed-back element 141 in the feed-back control section 140. In FIG. 34, "x0R" and "x0L" are the angle which sets the predetermined angle region.

Figure 35:
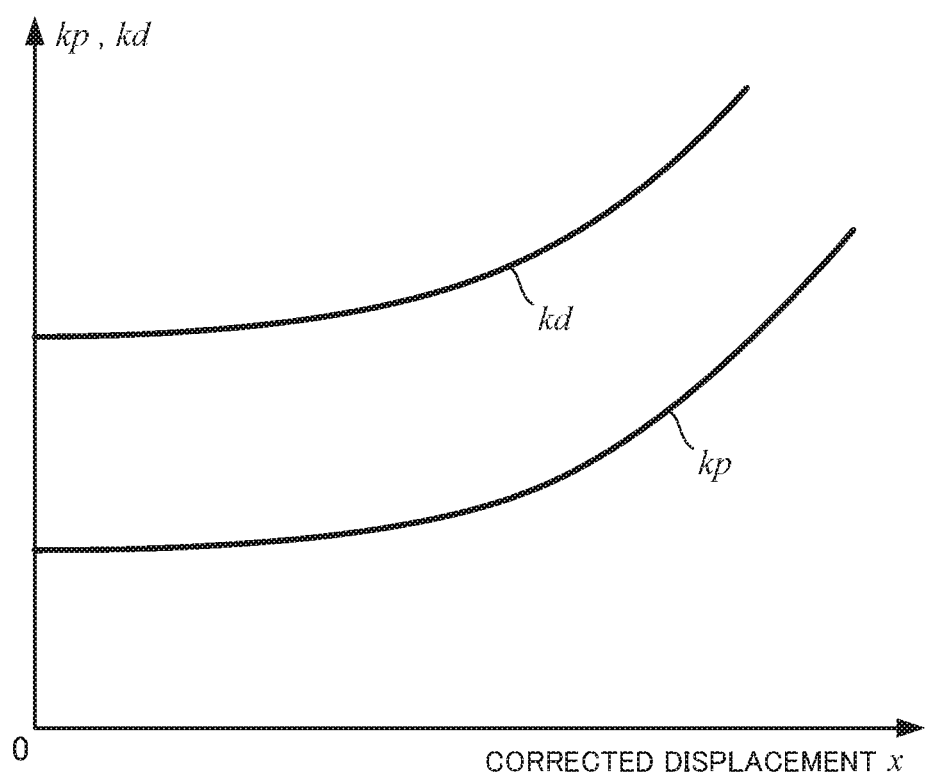
FIG. 35 is a characteristic diagram showing a characteristic example of a control parameter setting section of the fifth example.

Further, the control parameter setting section 211 of the control system inputs the rack displacement x and outputs the control parameters kd and kp with a nonlinear relationship that the increasing rate is larger as the rack displacement x is larger, for example, as shown in FIG. 35. The control parameters kd and kp are set in the control element section 143 of the feed-back control section 140 in accordance with the Equation 34.

The model parameter setting section 221 of the model system inputs the rack displacement x and outputs the model parameters μ (the viscous friction coefficient) and $k_0$ (the spring constant) with the characteristic as shown in FIG. 15. The model parameters μ and $k_0$ are set in the feed-back element (N/F) 141 of the feed-back control section 140.

Figure 36:
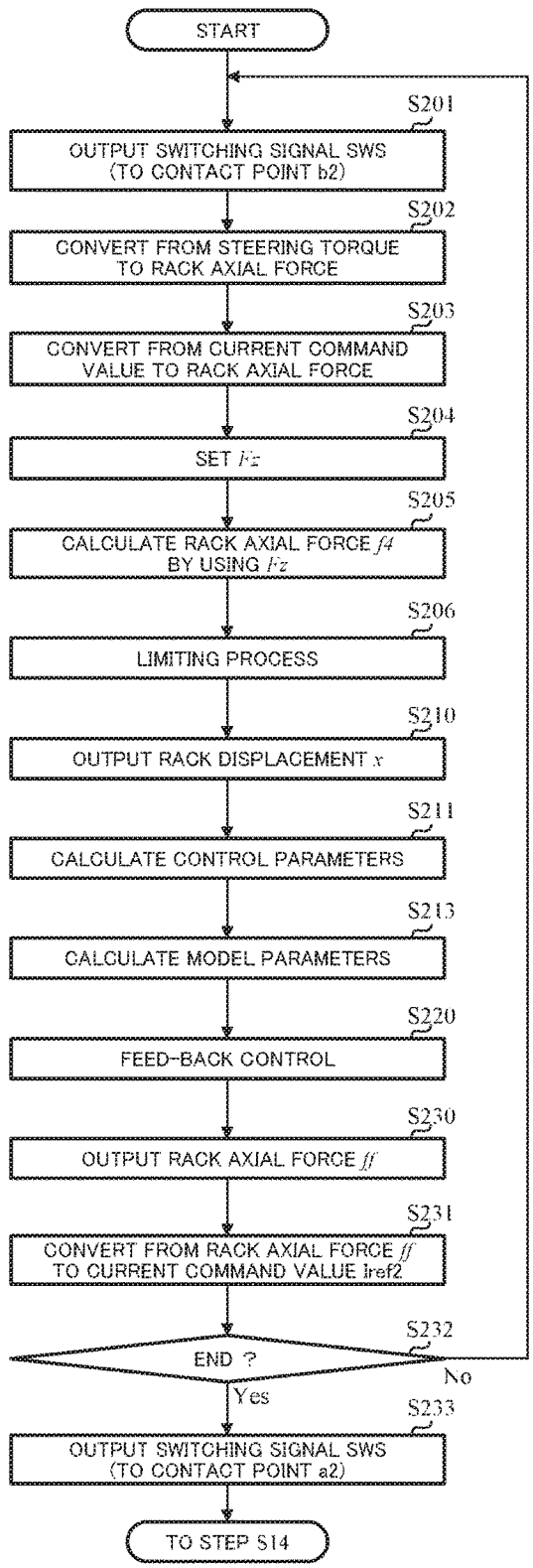
FIG. 36 is a flowchart showing an operation example of the fifth example according to the present invention.

In such a configuration, the operation example of the fifth example of FIG. 33 will be described with reference to a flowchart of FIG. 36.

The switching signal SWS is outputted from the rack end approach judging section 110, the contacts of the switching section 122 are switched from the contact point a2 to the contact point b2 (Step S201), and the steering torque Th is converted to the rack axial force f1 in the converting section 200 (Step S202). The current command value Iref1 is calculated in the torque control section 31 and is converted to the rack axial force f2 in the converting section 101 (Step S203). The rack axial force "f3=f1+f2" just when the switching section 122 is switched to the contact point b2 is set in the setting storing section 201-1 as the initial rack axial force Fz (Step S204). Thereafter, the rack axial force f4 is calculated by subtracting the stored initial rack axial force Fz from the rack axial force f'in the subtracting section 201-2 (Step S205), and the calculated rack axial force f4 is limiting-processed in the limiter 204 (Step S206). The limiting-processed rack axial force is inputted into the feed-back element 141 of the feed-back control section 140 as the input-side rack axial force f.

Further, the rack displacement x is outputted from the rack end approach judging section 110 (Step S210), the rack displacement x is subtracting-inputted into the subtracting section 142 of the feed-back control section 140 and is inputted into the control parameter setting section 211 and the model parameter setting section 221. The control parameter setting section 211 calculates the control parameters kp and kd based on the rack displacement x (Step S211), and the control parameters kp and kd are set in the control element section 143 of the feed-back control section 140. In addition, the model parameter setting section 221 calculates the model parameters μ and $k_0$ based on the rack displacement x (Step S213), and the model parameters μ and $k_0$ are set in the feed-back element 141 of the feed-back control section 140.

The feed-back control section 140 performs the feed-back control by using the rack axial force f, the rack displacement x, the control parameters kp and kd, and the model parameters μ and $k_0$ (Step S220), and outputs the output-side rack axial force ff (Step S230). The rack axial force ff is converted to the current command value Iref2 in the converting section 102 (Step S231), and this process is repeated to the end (Step S232).

When the process is ended in the Step S232, the contacts of the switching section 122 are switched from the contact point b2 to the contact point a2 by the output of the switching signal SWS (Step S233), and then the process is proceeded to the above Step S14 of FIG. 7.

Figure 37:
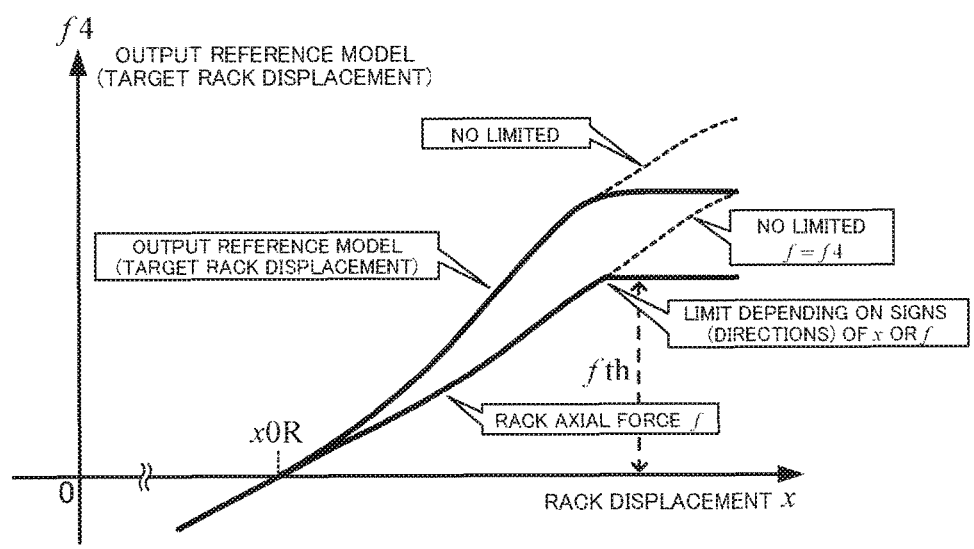
FIG. 37 is a characteristic diagram explaining an effect of the present invention.

The process of the feed-back control in the feed-back control section 140 is performed in the same way of the operation shown in FIG. 22. In the fifth example, because the input of the input-side rack axial force f is limited by the limiter 204, the reference model output saturates as shown by the solid line in FIG. 37. In case of no limitation, the reference model output does not saturate and continues varying as shown by the dashed line.

Figure 38:
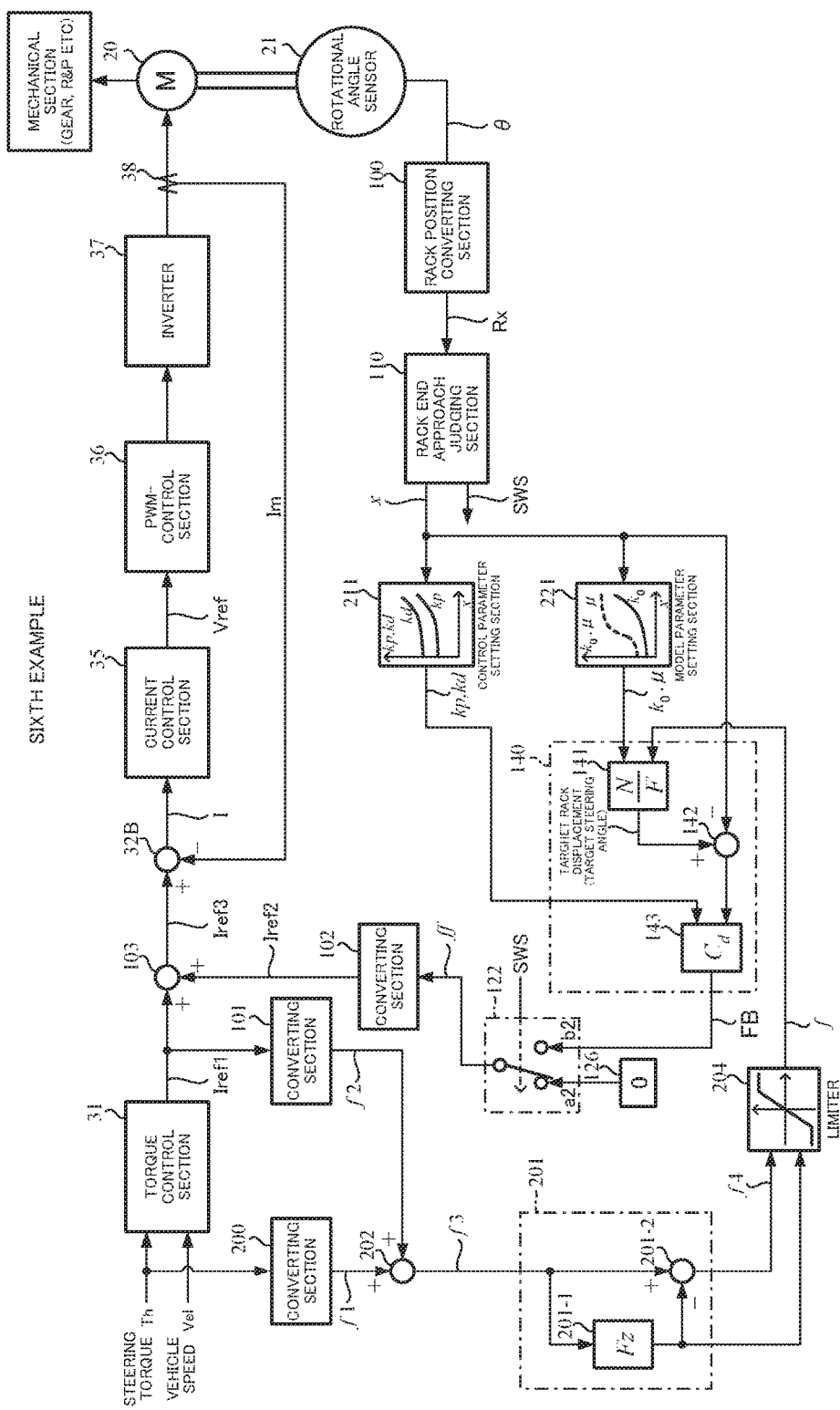
FIG. 38 is a block configuration diagram of the sixth example according to the present invention.

Next, the sixth example according to the present invention will be described with reference to FIG. 38.

Figure 39:
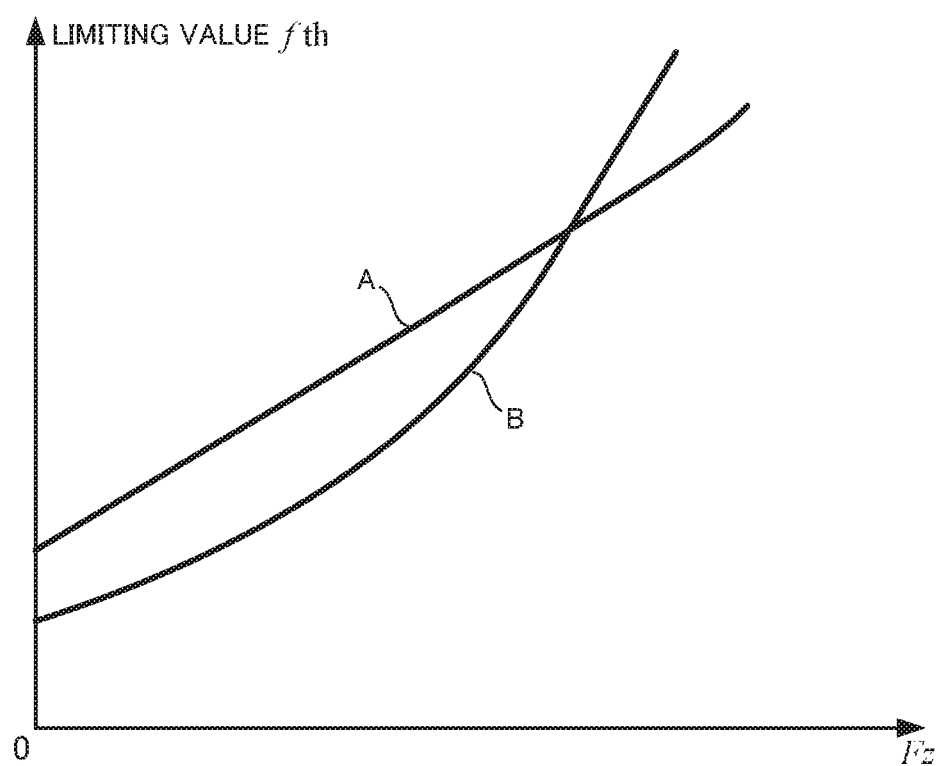
FIG. 39 is a characteristic diagram showing a varying example of a limiting value (increasing)
Figure 40:
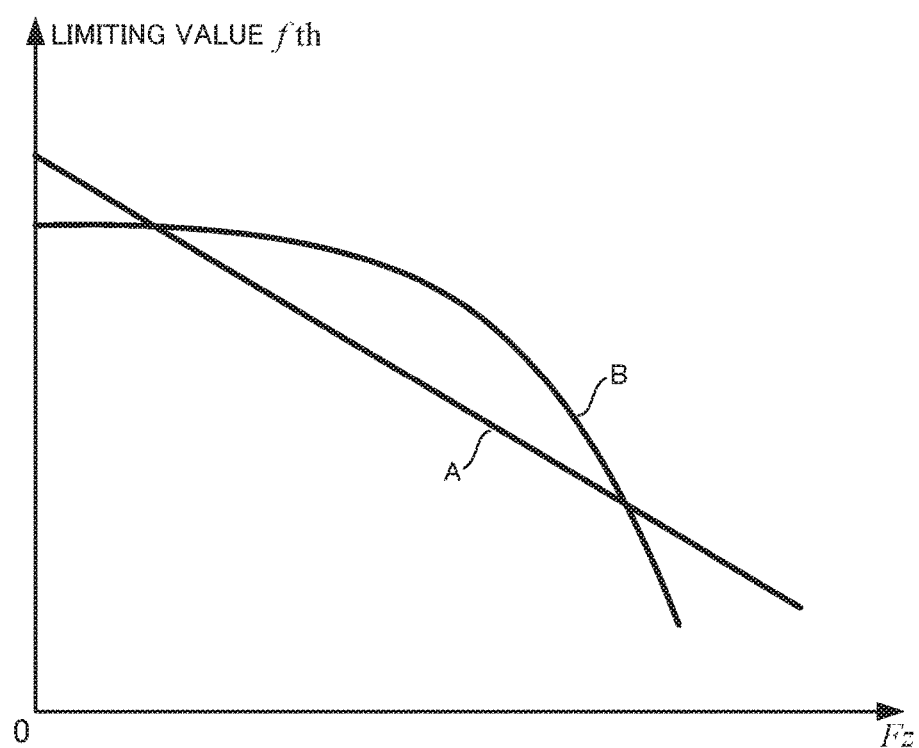
FIG. 40 is a characteristic diagram showing a varying example of a limiting value (decreasing)

In the sixth example, the initial rack axial force Fz, which is set and stored in the setting storing section 201-1, is inputted into the limiter 204 as a parameter. The limiting value fth for limiting the maximum value is changed depending on the initial rack axial force Fz. For example, as shown in the characteristic A of FIG. 39, the limiting value fth is small when the initial rack axial force Fz is small, and linearly increases as the initial rack axial force Fz is larger. Or, as shown in the characteristic B of FIG. 39, the limiting value fth is nonlinearly increased. Or, as shown in the characteristic A of FIG. 40, the limiting value fth is large when the initial rack axial force Fz is small, and linearly decreases as the initial rack axial force Fz is larger, or the limiting value fth nonlinearly decreases as the characteristic B of FIG. 40. Thus, it is possible to adjust the limiting value fth depending on a rise-up tendency (a rate that the rack axis force becomes large as the steering angle is larger) of the rack axial force of the vehicle.

Figure 41:
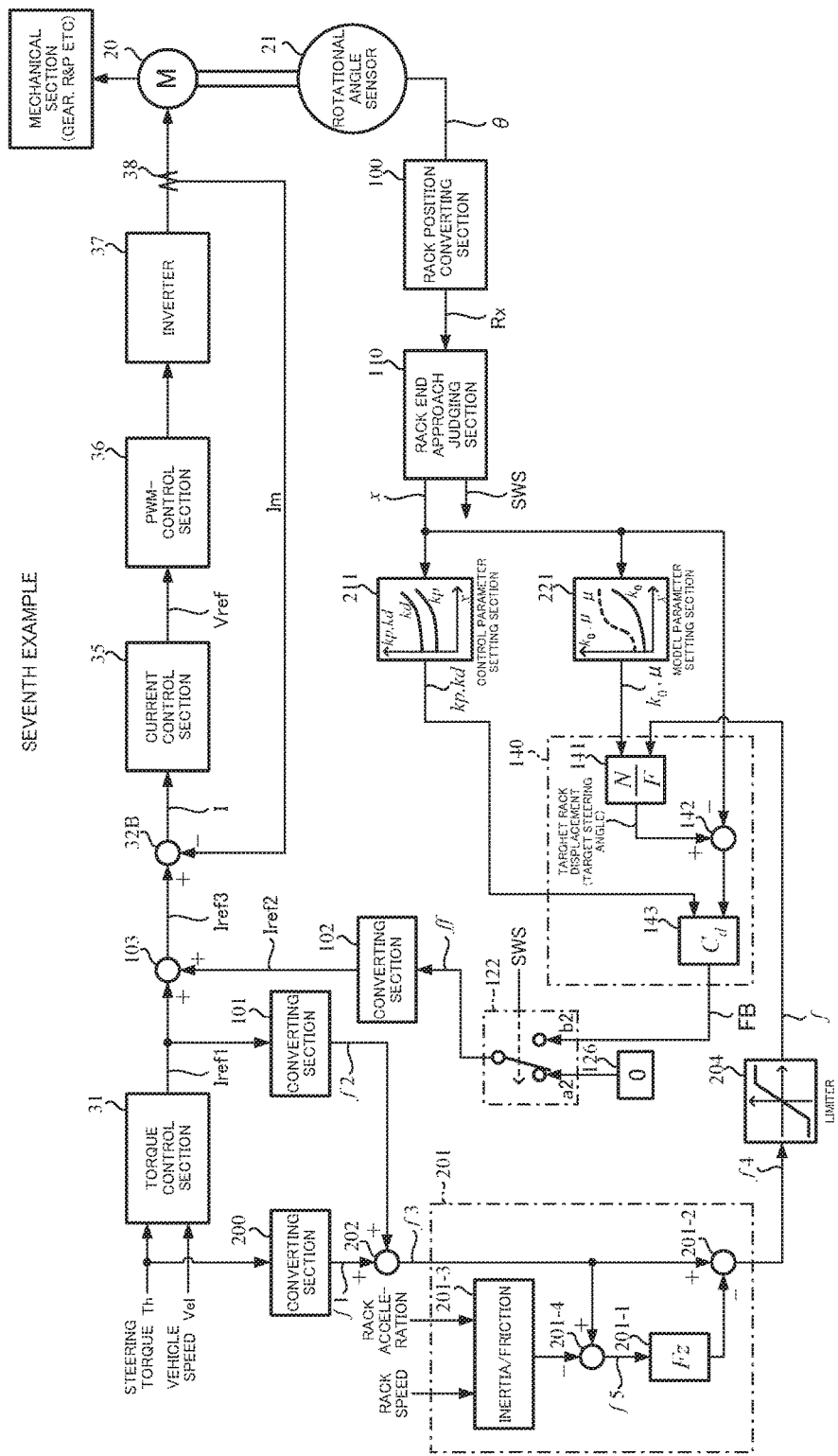
FIG. 41 is a block configuration diagram of the seventh example according to the present invention.

FIG. 41 shows the seventh example according to the present invention, and the inertia component and the friction component are eliminated in the setting of the initial rack axial force Fz. Thus, the stored initial rack axial force Fz is stored as the rack axial force when the steering holding is kept at the predetermined angle.

That is, in the seventh example, the axial force calculating section 201 further includes an inertia/friction section 201-3 and a subtracting section 201-4. A rack velocity and a rack acceleration are inputted into the inertia/friction section 201-3, and the calculated inertia component and friction component are adding-inputted into the subtracting section 201-4. The rack axial force f3 (=f1+f2) is also adding-inputted into the subtracting section 201-4, and the rack axial force f5 which is subtracting-processed in the subtracting section 201-4 is inputted into the setting storing section 201-1. Accordingly, when the rack displacement x becomes the predetermined angle, a rack axial force being subtracted the inertia component and the friction component is set and stored as the initial rack force Fz.

Figure 42:
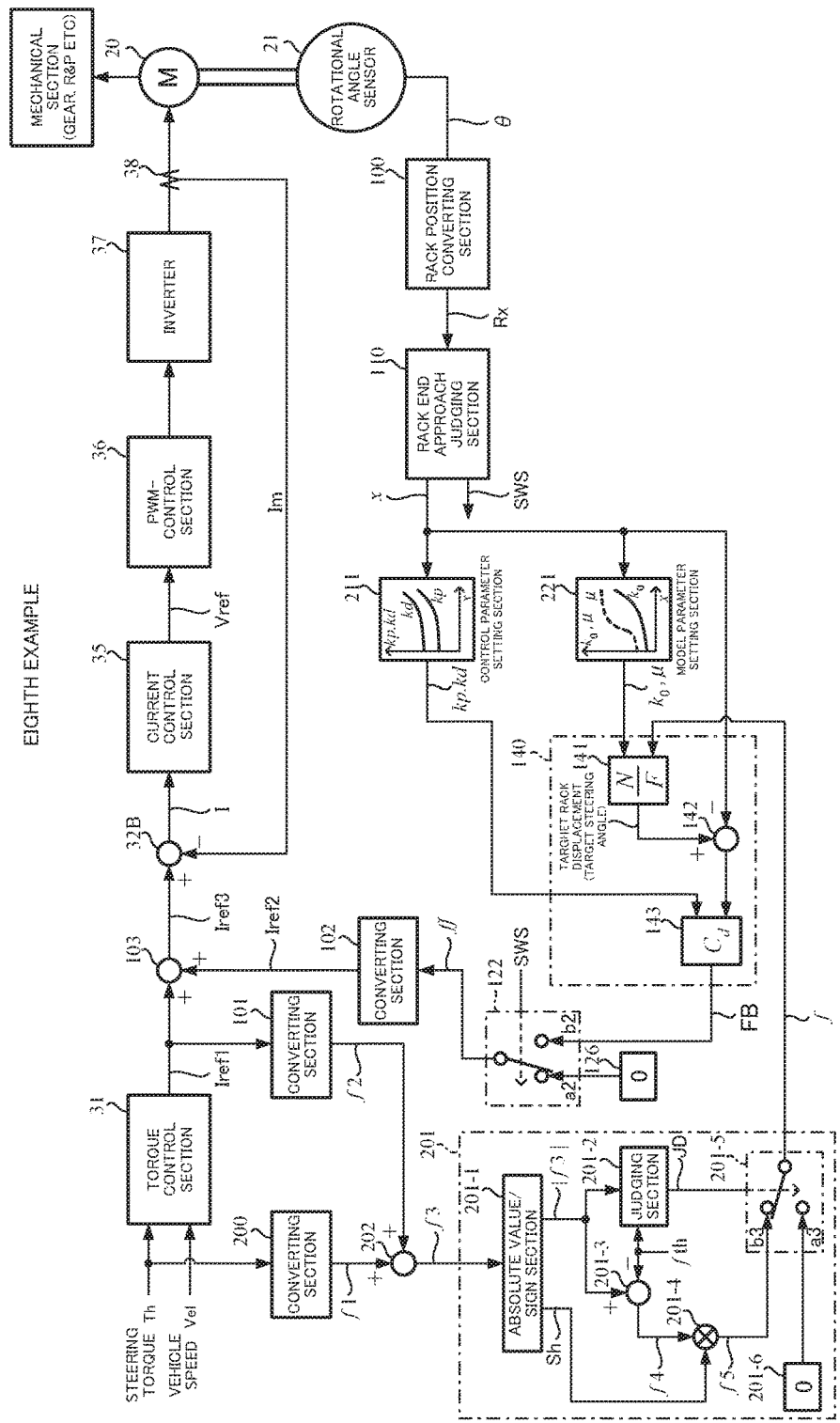
FIG. 42 is a block configuration diagram of the eighth example according to the present invention.

FIG. 42 shows the eighth example according to the present invention in corresponding to FIG. 3 and FIG.14, and there are provided the converting section 200 to convert from the steering torque Th to the rack axial force f1, the adding section 202 to add the rack axial force f1 and the rack axial force f2 from the converting section 101, the axial force calculating section 201 to calculate the input-side rack axial force f from the rack axial force f3 (=f1+f2) which is obtained from the adding section 202, the control parameter setting section 211 to set the control parameters of the control system, and the model parameter setting section 221 to set the model parameters of the model system.

The axial force calculating section 201 comprises an absolute value/sign section 201-1 to calculate the absolute value and the sign of the rack axial force f3, a judging section 201-2 to output the judging signal JD by comparing the calculated absolute value |f3| with the threshold fth, a subtracting section 201-3 to calculate a difference f4 (=|f3|−fth) between the absolute value |f3| and the threshold ft, a multiplying section 201-4 to multiply the difference f4 by the sign sn, a switching section 201-5 having the contacts a3 and b3, and a fixing section 201-6 to input the fixed value "0" into the contact a3 of the switching section 201-5. The judging signal JD of the judging section 201-2 switches the contacts of the switching section 201-5, and the switching of the contact points a3 and b3 by the judging signal JD is represented by the below Equation 36.

$$|f3| < fth, \text{ then switching to the contact point } a3$$

$$|f3| \geq fth, \text{ then switching to the contact point } b3 \qquad \text{[Equation 36]}$$

The control parameter setting section 211 of the control system inputs the rack displacement x and outputs the control parameters kd and kp with a nonlinear relationship that the increasing rate becomes large as the rack displacement x is larger, for example, as shown in FIG. 35. The control parameters kd and kp are set in the control element section 143 of the feed-back control section 140 in accordance with the above Equation 34.

Further, the model parameter setting section 221 of the model system inputs the rack displacement x and outputs the model parameters μ (the viscous friction coefficient) and $k_0$ (the spring constant) with the characteristic as shown in FIG. 15. The model parameters μ and $k_0$ are set in the feed-back element (N/F) 141 of the feed-back control section 140.

Figure 43:
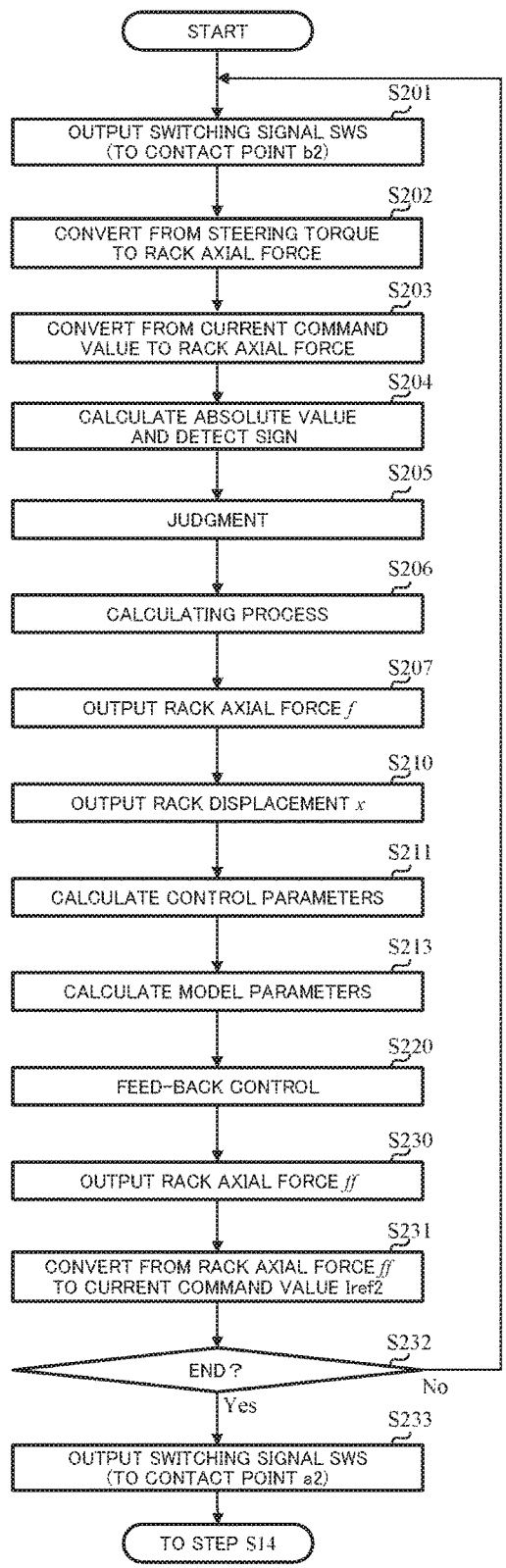
FIG. 43 is a flowchart showing an operation example of the eighth example according to the present invention.

In such a configuration, the operation example of the eighth example of FIG. 42 will be described with reference to a flowchart of FIG. 43.

The switching signal SWS is outputted from the rack end approach judging section 110, the contacts of the switching section 122 are switched from the contact point a2 to the contact point b2 (Step S201), and the steering torque Th is converted to the rack axial force f1 in the converting section 200 (Step S202). The current command value Iref1 is calculated in the torque control section 31 and is converted to the rack axial force f2 in the converting section 101 (Step S203). The rack axial forces f1 and f2 are added in the adding section 202, the added rack axial force f3 is inputted into the absolute value/sign section 201-1, the absolute value |f3| is calculated and the sign sn of the rack axial force f3 is detected (Step S204). The absolute value |f3| is inputted into the judging section 201-2, and the judging signal JD is outputted by comparing the absolute value |f3| with the threshold fth (Step S205). The absolute value |f3| is also inputted into the subtracting section 201-3, and the difference between the absolute value |f3| and the threshold fth is calculated. The difference f4 is multiplied by the sign sn in the multiplying section 201-4, and the rack axial force f5 which is a multiplied result is inputted into the contact b3 of the switching section 201-5 (Step S206). The switching section 201-5 is switched in accordance with the Equation 36, and the output of the switching section 201-5 is inputted into the feed-back element 141 of the feed-back control section 140 as the input-side rack axial force f (Step S207).

Furthermore, the rack displacement x is outputted from the rack end approach judging section 110 (Step S210), and the rack displacement x is subtracting-inputted into the subtracting section 142 of the feed-back control section 140 and is inputted into the control parameter setting section 211 and the model parameter setting section 221. The control parameter setting section 211 calculates the control parameters kp and kd based on the rack displacement x (Step S211), and the control parameters kp and kd are set in the control element section 143 of the feed-back control section 140. The model parameter setting section 221 calculates the model parameters μ and $k_0$ based on the rack displacement x (Step S213), and the model parameters μ and $k_0$ are set in the feed-back element 141 of the feed-back control section 140.

The feed-back control section 140 performs the feed-back control by using the rack axial force f, the rack displacement x, the control parameters kp and kd, and the model parameters μ and $k_0$ (Step S220), and outputs the output-side rack axial force ff (Step S230). The rack axial force ff is converted to the current command value Iref2 in the converting section 102 (Step S231), and this process continues to the end (Step S232).

When the process is ended in the above Step S232, the contacts of the switching section 122 are switched from the contact point b2 to the contact point a2 by the output of the switching signal SWS (Step S233), and then the process is proceeded to the Step S14 of FIG. 7.

The process of the feed-back control in the feed-back control section 140 performs the same operation shown in FIG. 22.

Figure 44A:
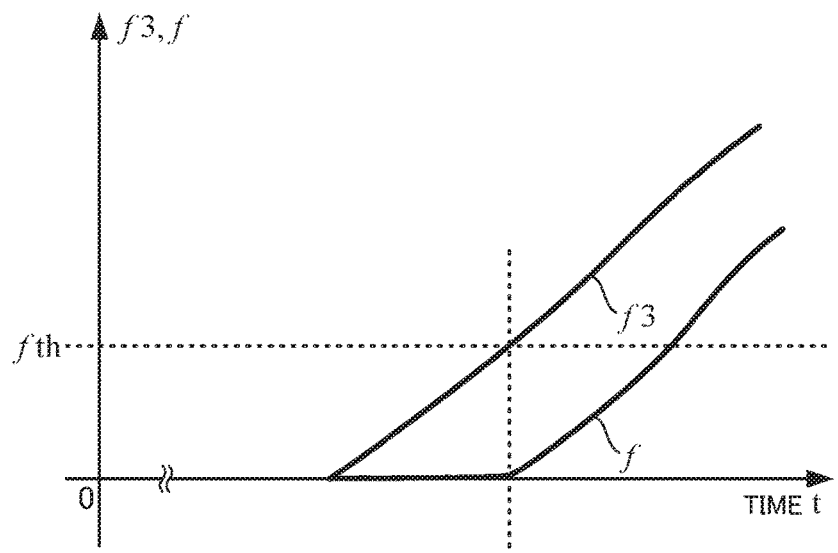
FIGS. 44A and 44B are timing charts showing an operation example of the eighth example according to the present invention.
Figure 44B:
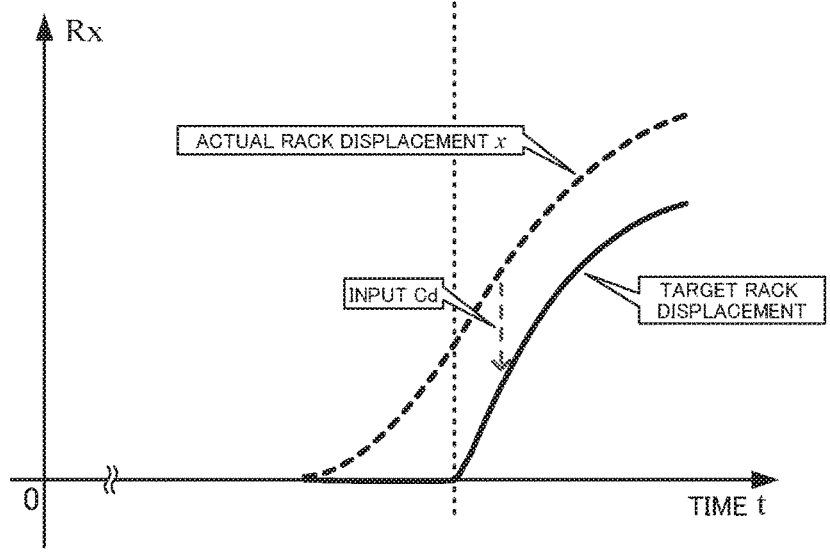

In the eighth example, after a time when the rack axial force f3 is the threshold fth or more as shown in FIG. 44A, the target rack displacement is outputted as shown in FIG. 44B.

Figure 45:
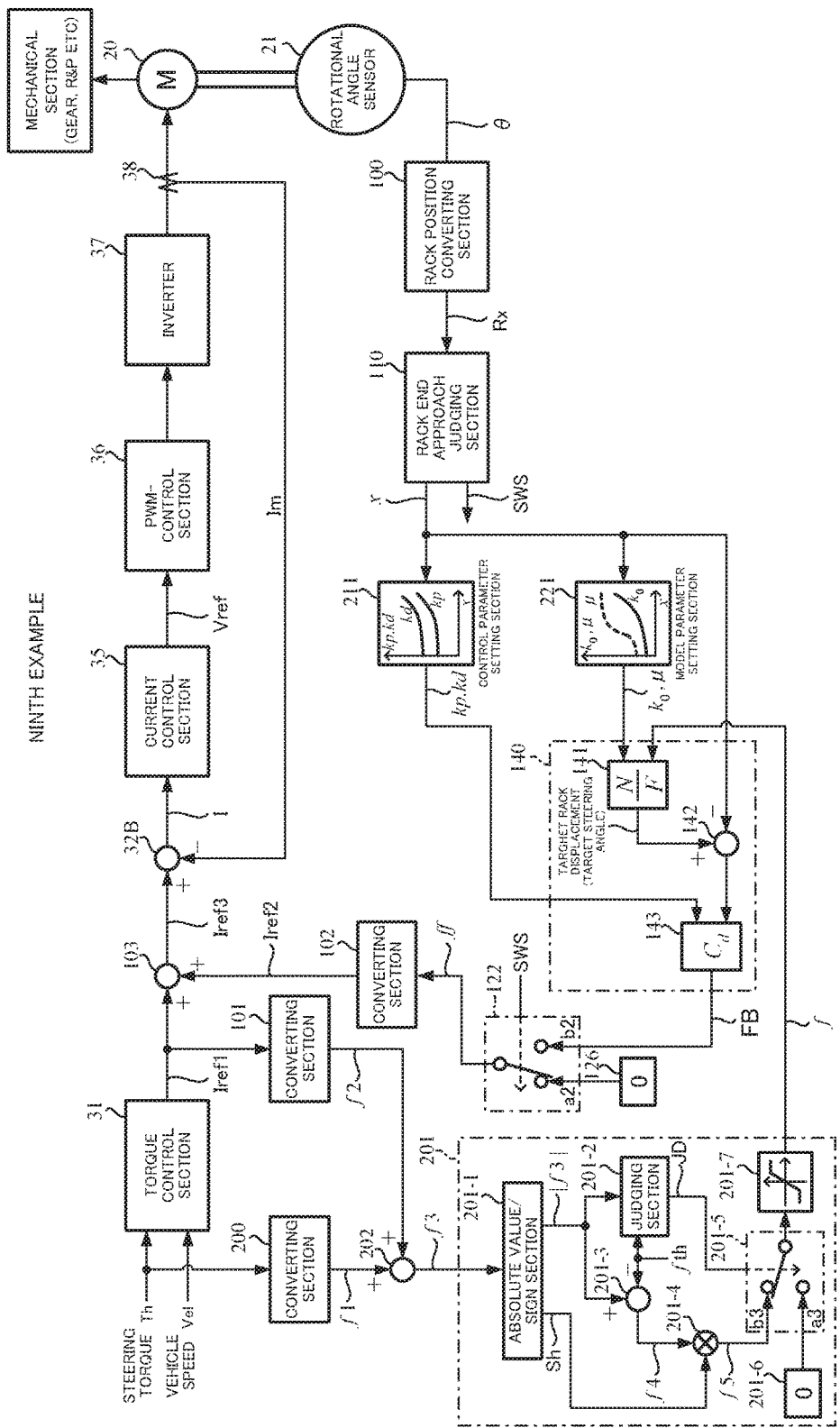
FIG. 45 is a block configuration diagram of the ninth example according to the present invention.

Next, the ninth example according to the present invention will be described with reference to FIG. 45 corresponding to FIG. 42.

Figure 46A:
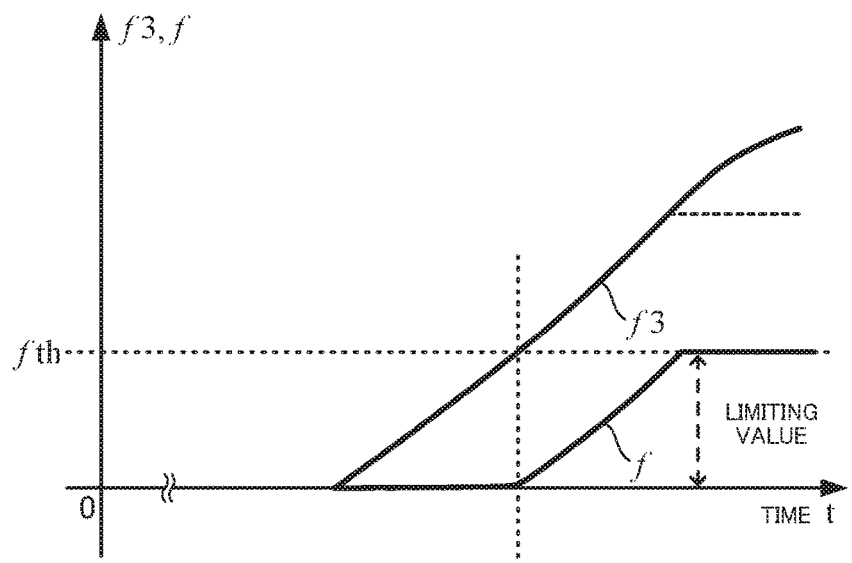
FIGS. 46A and 46B are timing charts showing an operation example of the ninth example according to the present invention.
Figure 46B:
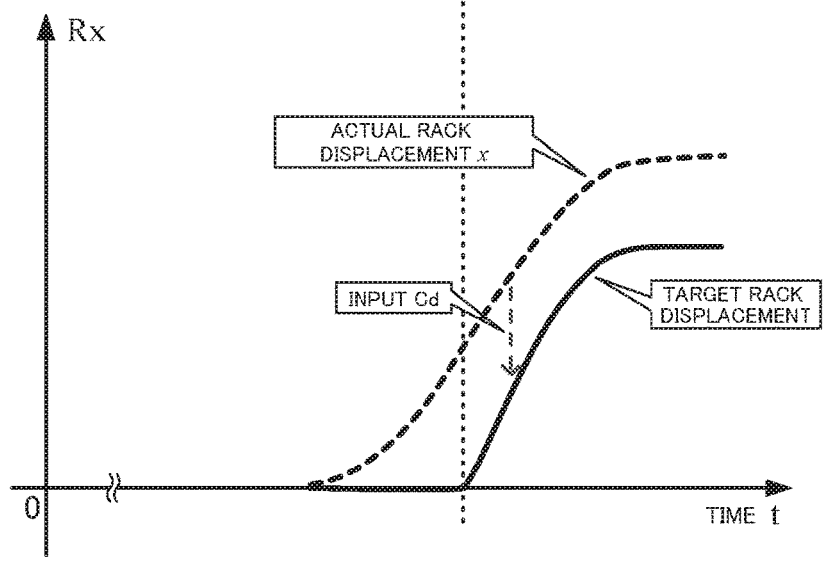

In the ninth example, the limiter 201-7 which limits the maximum value is provided at a rear stage of the switching section 201-5, and the rack axial force of which the maximum value is limited is inputted into the feed-back element 141 as the input-side rack axial force f. According to the ninth example, the maximum value of the rack axial force f is limited as shown in FIG. 46A, and the maximum value of the target rack displacement also saturates as shown in FIG. 46B.

The control element section 143 (Cd) may be any of PID (Proportional-Integral-Differential) control, PI control, or PD control. Although the position correcting section is distinguished from the parameter setting section in the above examples, the both sections may be integrated with one body. Further, although the rotational angle θ is obtained from the rotational sensor which is coupled to the motor in the above examples, the rotational angle θ may be obtained from the steering angle sensor.

EXPLANATION OF REFERENCE NUMERALS 1 handle
2 column shaft (steering shaft, handle shaft)
10 torque sensor
12 vehicle speed sensor
13 battery
14 steering angle sensor
20 motor
23 motor driving section
30 control unit (ECU)
31 torque control section
35 current control section
36 PWM-control section
100 rack position converting section
110 rack end approach judging section
120 viscoelastic model following control section
121, 122 switching section
130 feed-forward control section
140 feed-back control section

The invention claimed is:

1. An electric power steering apparatus that calculates a current command value based on at least a steering torque and assist-controls a steering system by driving a motor based on said current command value, comprising:
a configuration of a model following control comprising a feed-back control section including a viscoelastic model as a reference model within a predetermined angle $x_0$ at front of a rack end,
wherein said feed-back control section comprises a feed-back element to calculate a target rack displacement based on an input-side rack axial force f, and a control element section to output an output-side rack axial force ff based on a positional deviation between said target rack displacement and a rack displacement x; and
wherein said electric power steering apparatus further includes a correcting section that changes parameters of at least one-side of said feed-back element and said control element section and sets changed parameters.

2. The electric power steering apparatus according to claim 1, further including:
an axial force calculating section that obtains a rack axial force f3 by adding a rack axial force f1 due to said steering torque and a rack axial force f2 due to said current command value, stores said rack axial force f3 when said rack displacement x becomes within said predetermined angle $x_0$ serving as an initial rack axial force Fz, and thereafter calculates a difference between said rack axial force f3 and said initial rack axial force Fz as said input-side rack axial force f.

3. The electric power steering apparatus according to claim 2, wherein parameters of said control element section are calculated in a first position correcting section to perform a correction in response to said rack displacement x and a control parameter setting section to output control parameter s in response to a correcting displacement from said first position correcting section; and
wherein parameters of said feed-back element are calculated in a second position correcting section to perform a correction in response to said rack displacement x and a model parameter setting section to output model parameters in response to a correcting displacement from said second position correcting section.

4. The electric power steering apparatus according to claim 3, wherein output characteristics of said first position correcting section and said second position correcting section vary depending on said initial rack axial force Fz as a parameter.

5. The electric power steering apparatus according to claim 4, wherein a smaller said initial rack axial force Fz is, a larger a gain of said output characteristics is.

6. The electric power steering apparatus according to claim 3, wherein output characteristics of said first position correcting section and said second position correcting section vary depending on a vehicle speed as a parameter.

7. The electric power steering apparatus according to claim 6, wherein a larger said vehicle speed is, a larger a gain of said output characteristics is.

8. The electric power steering apparatus according to claim 3, wherein output characteristics of said first position correcting section and said second position correcting section vary depending on a motor angular velocity as a parameter.

9. The electric power steering apparatus according to claim 8, wherein a larger said motor angular velocity is, a larger a gain of said output characteristics is.

10. The electric power steering apparatus according to claim 3, wherein said first position correcting section and said control parameter setting section are an integral construction, and said second position correcting section and said model parameter setting section are an integral construction.

11. The electric power steering apparatus according to claim 2, wherein parameters of said control element section are calculated in a control parameter setting section to output control parameters in response to said rack displacement x, and parameters of said feed-back element are calculated in a model parameter setting section to output model parameters in response to said rack displacement x.

12. The electric power steering apparatus according to claim 11, wherein output characteristics of said first position correcting section and said second position correcting section vary depending on said initial rack axial force Fz as a parameter.

13. The electric power steering apparatus according to claim 12, wherein a smaller said initial rack axial force Fz is, a larger values of said control parameters are, and a smaller said initial rack axial force Fz is, a larger values of said model parameters are.

14. The electric power steering apparatus according to claim 1, further comprising:
an axial force calculating section to calculate a rack axial force f4 based on said steering torque and said current command value; and
a limiter to limit a maximum value of said rack axial force f4 with a limiting value and to output said input-side rack axial force f.

15. The electric power steering apparatus according to claim 14, wherein said limiting value is variably set.

16. The electric power steering apparatus according to claim 15, wherein said limiting value is variably set depending on said initial rack axial force Fz when said rack displacement x becomes to said predetermined angle $x_0$.

17. The electric power steering apparatus according to claim 16, wherein said limiting value linearly or nonlinearly increases in response to said initial rack axial force Fz.

18. The electric power steering apparatus according to claim 17, wherein an inertia component and a friction component are eliminated in calculation of said rack axial force.

19. The electric power steering apparatus according to claim 16, wherein said limiting value linearly or nonlinearly decreases in response to said initial rack axial force Fz.

20. The electric power steering apparatus according to claim 19, wherein an inertia component and a friction component are eliminated in calculation of said rack axial force.

21. The electric power steering apparatus according to claim 16, wherein an inertia component and a friction component are eliminated in calculation of said rack axial force.

22. The electric power steering apparatus according to claim 15, wherein an inertia component and a friction component are eliminated in calculation of said rack axial force.

23. The electric power steering apparatus according to claim 14, wherein an inertia component and a friction component are eliminated in calculation of said rack axial force.

24. The electric power steering apparatus according to claim 1, further including:
a rack axial force calculating section that calculates said input-side rack axial force f from a rack axial force f3 based on said steering torque and said current command value,
wherein said rack axial force calculating section comprises an absolute value/sign section to calculate an absolute value and a sign of said rack axial force f3; a judging section to judge whether said absolute value is a threshold or more; a subtracting section to subtract said threshold from said absolute value; a multiplying section to multiply a subtracted result with said sign; and a switching section to output a multiplied result or a fixed value.

25. The electric power steering apparatus according to claim 24, wherein said switching section outputs said multiplied result as said input-side rack axial force f when said judging section judges that said absolute value is said threshold or more.

26. The electric power steering apparatus according to claim 25, wherein said switching section outputs said fixed value as said input-side rack axial force f when said judging section judges that said absolute value is less than said threshold.

27. The electric power steering apparatus according to claim 25, wherein said fixed value is zero.

28. The electric power steering apparatus according to claim 24, wherein said switching section outputs said fixed value as said input-side rack axial force f when said judging section judges that said absolute value is less than said threshold.

29. The electric power steering apparatus according to claim 24, wherein said fixed value is zero.

30. The electric power steering apparatus according to claim 24, further including a limiter to limit a maximum value;

wherein said limiter is provided at a rear stage of said switching section.

\* \* \* \* \*